United States Patent
Nam et al.

(10) Patent No.: US 11,503,628 B2
(45) Date of Patent: Nov. 15, 2022

(54) COMMUNICATION OF A REFERENCE SIGNAL COUNT INDICATION

(71) Applicant: QUALCOMM Incorporated, San Diego, CA (US)

(72) Inventors: Wooseok Nam, San Diego, CA (US); Tao Luo, San Diego, CA (US); Alexandros Manolakos, San Diego, CA (US); Peter Gaal, San Diego, CA (US); Juan Montojo, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/126,576

(22) Filed: Sep. 10, 2018

(65) Prior Publication Data

US 2019/0082460 A1    Mar. 14, 2019

Related U.S. Application Data

(60) Provisional application No. 62/558,291, filed on Sep. 13, 2017.

(51) Int. Cl.
*H04W 72/14* (2009.01)
*H04L 5/00* (2006.01)
*H04W 72/04* (2009.01)

(52) U.S. Cl.
CPC ........... *H04W 72/14* (2013.01); *H04L 5/0044* (2013.01); *H04L 5/0048* (2013.01);
(Continued)

(58) Field of Classification Search
CPC ... H04L 5/0007; H04L 5/0044; H04L 5/0048; H04L 5/0091; H04W 72/0446; H04W 72/14
(Continued)

(56) References Cited

U.S. PATENT DOCUMENTS 9,980,257 B2    5/2018  Chen et al.
2011/0317581 A1* 12/2011  Hoshino ............... H04B 7/0486
                                                370/252

(Continued)

FOREIGN PATENT DOCUMENTS

WO    WO-2016048595 A1    3/2016
WO    WO-2019014920 A1 *  1/2019  ............ H04W 24/00

OTHER PUBLICATIONS

English Translation of WO-2019014920-A1, Publication date: Jan. 2019, retrieved from PE2E Search on Mar. 11, 2022. (Year: 2019).*
(Continued)

*Primary Examiner* — Omar J Ghowrwal
(74) *Attorney, Agent, or Firm* — Holland & Hart LLP/Qualcomm Incorporated

(57) ABSTRACT

Methods, systems, and devices for wireless communications are described. A user equipment (UE) may receive, from a base station, a resource grant for a data communication within a transmission time interval (TTI). The UE may receive, from the base station, an indication of a control signal configuration and an end symbol index associated with the resource grant. The UE may identify, based at least in part on the received indication, a plurality of symbol positions in the TTI in which reference signals are to be communicated in conjunction with the data communication.

30 Claims, 21 Drawing Sheets

(52) U.S. Cl.
CPC ....... *H04L 5/0091* (2013.01); *H04W 72/0446* (2013.01); *H04L 5/0007* (2013.01)
(58) Field of Classification Search
USPC .......................................................... 370/336
See application file for complete search history.

(56) References Cited

U.S. PATENT DOCUMENTS

| | | | |
|---|---|---|---|
| 2016/0095092 A1 | 3/2016 | Khoryaev et al. | |
| 2016/0095105 A1* | 3/2016 | Chen ................. | H04L 5/0091 370/329 |
| 2016/0338046 A1 | 11/2016 | Chen et al. | |
| 2017/0134236 A1* | 5/2017 | Patel ................. | H04W 74/004 |
| 2017/0230992 A1 | 8/2017 | Patel et al. | |
| 2017/0338923 A1* | 11/2017 | Prasad ............ | H04W 36/00837 |

OTHER PUBLICATIONS

Nokia et al., "On 2-OS sPUSCH Structure and Details of UL DMRS in Shorter TTI", 3GPP Draft; R1-1612153, 3rd Generation Partnership Project (3gpp), Mobile Competence Centre, 650, Route Des Lucioles, F-06921 Sophia-Antipolis Cedex, France, vol. RAN WG1, No. Reno, Nevada, US; Nov. 4, 2016, XP051189192, Retrieved from the Internet: URL:http://www.3gpp.org/ftp/tsg_ran/WG1_RL1/TSGR1_87/Docs/ [retrieved on Nov. 4, 2016], 5 pages.

Qualcomm Incorporated: "sTTI Operation", 3GPP Draft; R1-1611637, 3rd Generation Partnership Project (3GPP), Mobile Competence Centre, 650, Route Des Lucioles, F-06921 Sophia-Antipolis Cedex, France, vol. RAN WG1, No. Reno. Nevada, USA; Nov. 5, 2016, XP051190043, Retrieved from the Internet: URL:http://www.3gpp.org/ftp/tsg_ran/WG1_RL1/TSGR1_87/Docs/ [retrieved on Nov. 5, 2016], 6 pages.

International Search Report and Written Opinion—PCT/US2018/050472—ISA/EPO—dated Nov. 15, 2018.

Taiwan Search Report—TW107131857—TIPO—dated Sep. 23, 2021.

Chang-Xi G., et al., "Encrypted Traffic Classification Based on Packet Length Distribution of Sampling Sequence", Journal on Communications, vol. 36, No. 9, DOI: 10.11959/j.issn.1000-436x.2015171, Sep. 25, 2015, 28 Pages.

NEC: "DL/UL RA Schemes for NR", 3GPP TSG RAN WG1 adhoc_NR_AH_1709, R1-1716230, 3GPP, Sep. 11, 2017, 12 Pages.

Spreadtrum Communications: "The Relation Among UE-Specific DCI, GC-PDCCH, and Semi-Static Signaling", 3GPP TSG RAN WG1 Adhoc_NR_AH_1706, R1-1710368, 3GPP, Jun. 16, 2017, 5 Pages.

Vivo: "DCI Contents and Design", 3GPP TSG RAN WG1 adhoc_NR_AH_1709, R1-1715633, 3GPP, Sep. 11, 2017, 6 Pages.

Zte, et al., "Remaining Details on DL DMRS and UL DMRS", 3GPP TSG RAN WG1 adhoc_NR_AH_1709, R1-1715449, 3GPP, Sep. 12, 2017, 10 Pages.

* cited by examiner

COMMUNICATION OF A REFERENCE SIGNAL COUNT INDICATION

CROSS REFERENCES

The present Application for Patent claims the benefit of U.S. Provisional Patent Application No. 62/558,291 by NAM, et al., entitled "DETERMINATION OF REFERENCE SIGNAL PATTERNS," filed Sep. 13, 2017, assigned to the assignee hereof, and expressly incorporated by reference herein.

BACKGROUND

The following relates generally to wireless communication, and more specifically to determination of reference signal patterns in a slot or transmission time interval (TTI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may be configured to support transmission of various non-data signals in conjunction with data communications, e.g., reference signals, synchronization signals, and the like. For example, a data communication (either uplink or downlink data communications) may be transmitted in a data channel (e.g., a physical downlink shared channel (PDSCH) or a physical uplink shared channel (PUSCH)) that includes a plurality of symbol periods. Each symbol period may be used for data communications, for non-data signals, or, in some examples, data and non-data signals multiplexed in the symbol. The communicating devices (e.g., a UE and/or a base station) need to be aware of the location of the non-data signal(s) in the data channel. Explicitly communicating the location of the non-data signal(s), however, requires valuable overhead in terms of signaling and/or processing. Moreover, next generation wireless systems, such as NR wireless communication systems, may provide increased flexibility with respect to scheduling of data channels such that the starting and ending positions (e.g., symbols) or the duration of the data channel within a particular slot may be arbitrary. Thus, there is even more of a need to efficiently signal and/or determine the location of non-data signal locations within the data channel.

SUMMARY

The described techniques relate to improved methods, systems, devices, or apparatuses that support determination of reference signal patterns within a slot or transmission time interval (TTI). Generally, the described techniques provide for an efficient mechanism for signaling and/or determining the location of non-data signals in a data channel. The data channel may be a downlink data channel (e.g., a physical downlink shared channel (PDSCH)) or an uplink channel (e.g., a physical uplink shared channel (PUSCH)). The data channel may vary in size in that the number of symbols occupied by data communications may vary on a per-TTI basis. In some aspects, a base station may grant resources to a user equipment (UE) for data communications in the data channel and during the TTI (e.g., a slot, a subframe, and the like). The base station may convey an indication of the resource grant to the UE and also an indication of a control signal configuration and an end symbol index for the resource grant. The UE may receive the indication from the base station and identify the symbol position(s) in the TTI in which non-data signals (e.g., reference signals) are to be communicated. The non-data signals may include reference signals (e.g., demodulation reference signals (DMRSs), channel state information reference signals (CSI-RSs), and the like), synchronization signals (e.g., primary synchronization signals (PSSs), secondary synchronization signal(s) (SSSs), and the like), physical random access channel (PRACH) signals, and the like. The indication may include a pointer to a particular reference signal configuration (e.g., an index to one reference signal configuration from a plurality of available reference signal configurations) that the UE uses to identify the non-data signal location(s) within the TTI. In some instances, the TTI may include a default non-data signal in a known location (e.g., the first symbol following control channel symbols) and the indication may be used by the UE to determine the location of any additional non-data signals communicated in the TTI.

A method of wireless communication is described. The method may include receiving, from a base station, a resource grant for a data communication within a TTI, receiving, from the base station, an indication of a control signal configuration and an end symbol index associated with the resource grant, and identifying, based at least in part on the received indication, a plurality of symbol positions in the TTI in which reference signals are to be communicated in conjunction with the data communication.

An apparatus for wireless communication is described. The apparatus may include means for receiving, from a base station, a resource grant for a data communication within a TTI, means for receiving, from the base station, an indication of a control signal configuration and an end symbol index associated with the resource grant, and means for identifying, based at least in part on the received indication, a plurality of symbol positions in the TTI in which reference signals are to be communicated in conjunction with the data communication.

Another apparatus for wireless communication is described. The apparatus may include a processor, memory in electronic communication with the processor, and instructions stored in the memory. The instructions may be operable to cause the processor to receive, from a base station, a resource grant for a data communication within a TTI, receive, from the base station, an indication of a control signal configuration and an end symbol index associated with the resource grant, and identify, based at least in part on the received indication, a plurality of symbol positions in the TTI in which reference signals are to be communicated in conjunction with the data communication.

A non-transitory computer readable medium for wireless communication is described. The non-transitory computer-readable medium may include instructions operable to cause a processor to receive, from a base station, a resource grant for a data communication within a TTI, receive, from the base station, an indication of a control signal configuration and an end symbol index associated with the resource grant, and identify, based at least in part on the received indication, a plurality of symbol positions in the TTI in which reference signals are to be communicated in conjunction with the data communication.

In some examples of the method, apparatus, and non-transitory computer-readable medium described above, identifying the plurality of symbol positions in the TTI in which reference signals may be to be communicated comprises: selecting a reference signal configuration for the TTI from a set of reference signal configurations based at least in part on the received indication. Some examples of the method, apparatus, and non-transitory computer-readable medium described above may further include processes, features, means, or instructions for identifying the plurality of symbol positions based at least in part on the selected reference signal configuration.

Some examples of the method, apparatus, and non-transitory computer-readable medium described above may further include processes, features, means, or instructions for identifying the end symbol index as associated with a last data symbol in the TTI used for the data communication.

In some examples of the method, apparatus, and non-transitory computer-readable medium described above, identifying the plurality of symbol positions in the TTI in which reference signals may be to be communicated further comprises: receiving, from the base station, an additional indication of a last symbol position of the plurality of positions in the TTI in which reference signals may be to be communicated, the additional indication being relative to the end symbol index. Some examples of the method, apparatus, and non-transitory computer-readable medium described above may further include processes, features, means, or instructions for identifying the last symbol position based at least in part on the additional indication.

In some examples of the method, apparatus, and non-transitory computer-readable medium described above, the additional indication indicates whether the last symbol position may be before or after the end symbol index.

In some examples of the method, apparatus, and non-transitory computer-readable medium described above, the additional indication comprises at least one bit in a downlink control indicator (DCI).

In some examples of the method, apparatus, and non-transitory computer-readable medium described above, the additional indication comprises a field in a radio resource control (RRC) signal.

Some examples of the method, apparatus, and non-transitory computer-readable medium described above may further include processes, features, means, or instructions for determining that one or more resource elements of one or more of the plurality of symbol positions may be available for data communications. Some examples of the method, apparatus, and non-transitory computer-readable medium described above may further include processes, features, means, or instructions for multiplexing, in the frequency domain, the data communication and a reference signal communicated in the one or more of the plurality of symbol positions.

Some examples of the method, apparatus, and non-transitory computer-readable medium described above may further include processes, features, means, or instructions for determining that no resource elements of a symbol position of the plurality of symbol positions may be available for the data communication. Some examples of the method, apparatus, and non-transitory computer-readable medium described above may further include processes, features, means, or instructions for communicating, based at least in part on the determining, a reference signal in the symbol position of the plurality of symbol positions.

Some examples of the method, apparatus, and non-transitory computer-readable medium described above may further include processes, features, means, or instructions for receiving, from the base station, a reference signal count indication, indicating a number of reference signals to be communicated in the TTI. Some examples of the method, apparatus, and non-transitory computer-readable medium described above may further include processes, features, means, or instructions for receiving, from the base station, an additional indication of a last symbol position of the plurality of positions in the TTI in which reference signals may be to be communicated, the additional indication being relative to the end symbol index, wherein the additional indication may have priority over the reference signal count indication if a conflict exists between the number of reference signals to be communicated in the TTI and the plurality of symbol positions.

In some examples of the method, apparatus, and non-transitory computer-readable medium described above, the reference signal count indication may be received in a RRC signal and the additional indication may be received in a DCI signaling.

A method of wireless communication is described. The method may include transmitting, to a UE, a resource grant for a data communication within a TTI, selecting a plurality of symbol positions in the TTI in which reference signals are to be communicated in conjunction with a data communication, and transmitting an indication of a control signal configuration and an end symbol index associated with the resource grant so as to allow the UE to identify the plurality of symbol positions in the TTI in which reference signals are to be communicated.

An apparatus for wireless communication is described. The apparatus may include means for transmitting, to a UE, a resource grant for a data communication within a TTI, means for selecting a plurality of symbol positions in the TTI in which reference signals are to be communicated in conjunction with a data communication, and means for transmitting an indication of a control signal configuration and an end symbol index associated with the resource grant so as to allow the UE to identify the plurality of symbol positions in the TTI in which reference signals are to be communicated.

Another apparatus for wireless communication is described. The apparatus may include a processor, memory in electronic communication with the processor, and instructions stored in the memory. The instructions may be operable to cause the processor to transmit, to a UE, a resource grant for a data communication within a TTI, select a plurality of symbol positions in the TTI in which reference signals are to be communicated in conjunction with a data communication, and transmit an indication of a control signal configuration and an end symbol index associated with the resource grant so as to allow the UE to identify the plurality of symbol positions in the TTI in which reference signals are to be communicated.

A non-transitory computer readable medium for wireless communication is described. The non-transitory computer-readable medium may include instructions operable to cause a processor to transmit, to a UE, a resource grant for a data communication within a TTI, select a plurality of symbol positions in the TTI in which reference signals are to be communicated in conjunction with a data communication, and transmit an indication of a control signal configuration and an end symbol index associated with the resource grant so as to allow the UE to identify the plurality of symbol positions in the TTI in which reference signals are to be communicated.

Some examples of the method, apparatus, and non-transitory computer-readable medium described above may further include processes, features, means, or instructions for selecting a last symbol position of the plurality of positions in the TTI in which reference signals may be to be communicated, relative to the end symbol index. Some examples of the method, apparatus, and non-transitory computer-readable medium described above may further include processes, features, means, or instructions for transmitting an additional indication of the last symbol position to the UE.

Some examples of the method, apparatus, and non-transitory computer-readable medium described above may further include processes, features, means, or instructions for transmitting the additional indication in at least one bit of a DCI.

Some examples of the method, apparatus, and non-transitory computer-readable medium described above may further include processes, features, means, or instructions for transmitting the additional indication in a field of a RRC signal.

Some examples of the method, apparatus, and non-transitory computer-readable medium described above may further include processes, features, means, or instructions for transmitting, to the UE, a reference signal count indication, indicating a number of reference signals to be communicated in the TTI. Some examples of the method, apparatus, and non-transitory computer-readable medium described above may further include processes, features, means, or instructions for transmitting, to the UE, an additional indication of a last symbol position of the plurality of positions in the TTI in which reference signals may be to be communicated, the additional indication being relative to the end symbol index, wherein the additional indication may have priority over the reference signal count indication if a conflict exists between the number of reference signals to be communicated in the TTI and the one or more symbol positions.

DETAILED DESCRIPTION

Certain wireless communication systems may support flexible scheduling of data channels, such as uplink data channels (e.g., physical uplink shared channel (PUSCH)) or downlink channels (e.g., physical downlink shared channel (PDSCH)). The data may be communicated during a transmission time interval (TTI), such as a slot, a subframe, and the like. Non-data signals (e.g., reference signals, synchronization signals, and the like) may also be communicated during the TTI, e.g., in the same slot. The communicating devices, however, must know where in the TTI the data signals are being communicated and the non-data signals are being communicated. Conventional techniques may utilize explicit signaling of the locations of the data and non-data signals in the TTI, which incurs an overhead cost in terms of signaling, processing, and the like. Thus, there is a need for more efficient mechanisms that allow the communicating devices, such as user equipment (UE), to determine the location of non-data signals transmitted in the TTI in conjunction with the data communications.

Aspects of the disclosure are initially described in the context of a wireless communications system. Generally, a base station identifies where in a TTI the non-data signals are being communicated and transmits an indication of the location to a UE. However, the transmitted indication may not be an explicit indication of which symbols contain non-data signals being communicated, as was previously done. Instead, the indication may include transmitting an end symbol index, along with other known or indicated information (such as the resource grant for the data communication), that allows the UE to identify the symbol(s) in the TTI that non-data signals are being communicated. For example, the base station may indicate to the UE a control signal configuration and the indication of the end symbol index (along with the resource grant). The UE may use the indication from the base station (and the resource grant) to identify which symbol position(s) are being used for the non-data signal communications in conjunction with the data communications. The UE and base station may perform the communications according to the resource grant and the symbol positions in the TTI that non-data signals are communicated.

Aspects of the disclosure are further illustrated by and described with reference to apparatus diagrams, system diagrams, and flowcharts that relate to determination of reference signal patterns.

Figure 1:
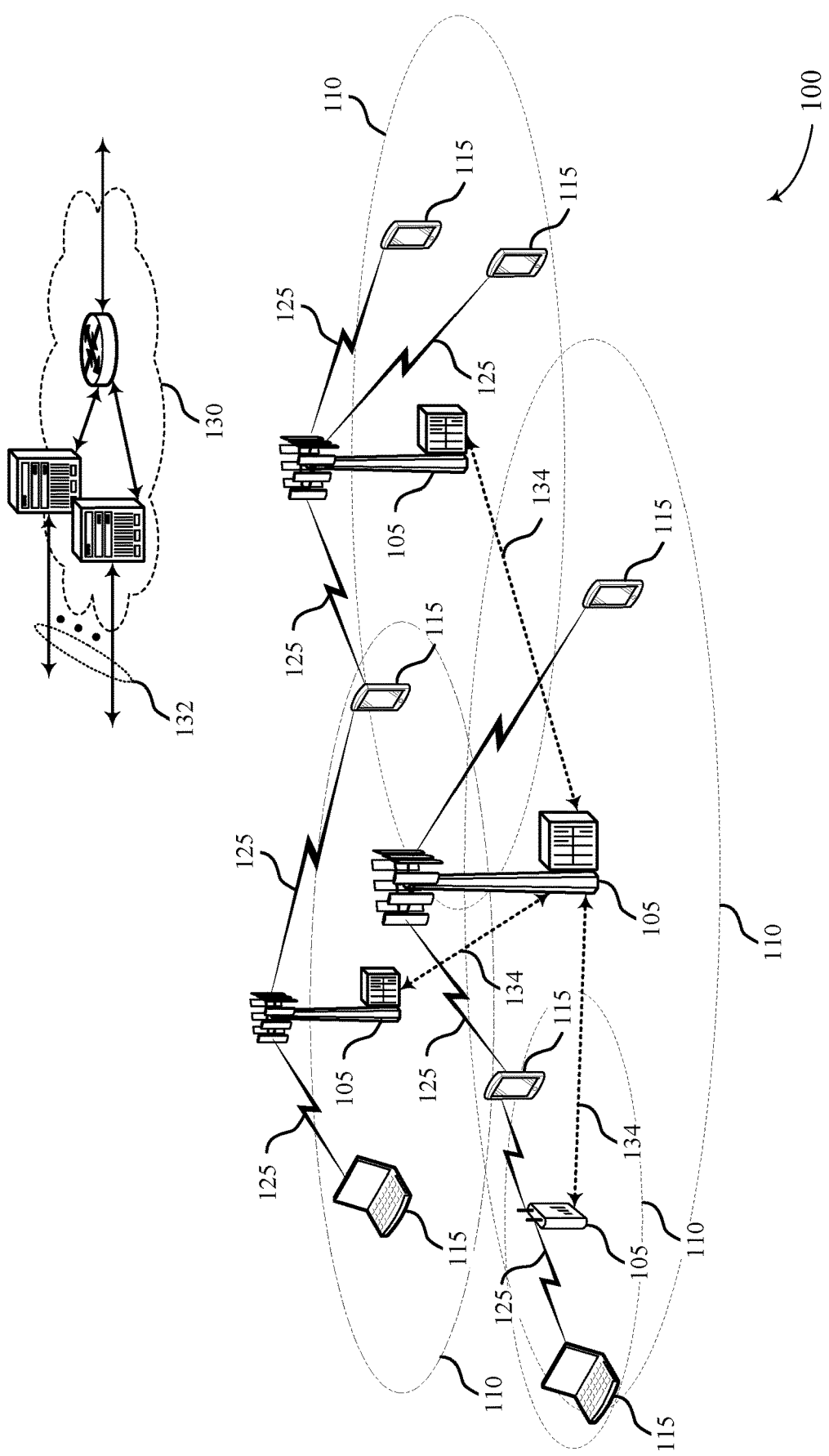
FIG. 1 illustrates an example of a system for wireless communication that supports determination of reference signal patterns in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe (e.g., a slot) or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may transmit, to a UE 115, a resource grant for a data communication within a TTI. The base station 105 may select a plurality of symbol positions in the TTI in which reference signals are to be communicated in conjunction with a data communication. The base station 105 may transmit an indication of a control signal configuration and an end symbol index associated with the resource grant so as to allow the UE to identify the plurality of symbol positions in the TTI in which reference signals are to be communicated.

A UE 115 may receive, from a base station 105, a resource grant for a data communication within a TTI. The UE 115 may receive, from the base station 105, an indication of a control signal configuration and an end symbol index associated with the resource grant. The UE 115 may identify, based at least in part on the received indication, a plurality of symbol positions in the TTI in which reference signals are to be communicated in conjunction with the data communication.

FIGS. 2A-2F illustrate examples of slot configurations 200 that support determination of reference signal patterns in accordance with various aspects of the present disclosure. In some examples, slot configurations 200 may implement aspects of wireless communication system 100. Aspects of slot configurations 200 may be implemented by a UE and/or a base station, which may be examples of the corresponding devices described herein.

Generally, slot configurations 200 illustrate one example of a TTI which may be utilized in accordance with aspects of the present disclosure. In the example slot configurations 200, the TTI may refer to a slot. Each slot configuration 200 may include a plurality of symbols (shown along the vertical axis), with fourteen symbols (labeled 0-13) being shown by way of example only. Each slot configuration 200 may include a plurality of channels (shown along the horizontal axis), with 12 channels (labeled 0-11) being shown by way of example only. It is to be understood that a TTI is not limited to a slot, and instead may include a mini-slot, a subframe, a frame, and the like. Moreover, it is also to be understood that, when the TTI is a slot, that the slot may differ in terms of symbols and/or channels from the slot configurations 200.

Each slot configuration 200 may include a control region that includes a plurality of control resources 205. In some aspects, the control region may be defined by a control signal configuration signaled from the base station to a UE. In some examples, the control region includes the first one, two, or three symbols of the slot configuration 200.

Each slot configuration 200 may include reference signal(s) (shown as "RS") 210 being communicated in a plurality of symbol positions in the slot configuration 200. It is to be understood that references to a reference signal 210 may refer to any non-data signal, such as a DMRS, CSI-RS, PSS, SSS, PRACH signal, and the like. In some examples, the symbol position immediately following the control region may include a reference signal 210, e.g., the reference signal 210 may be front loaded, which may be fixed or otherwise known by all devices. That is, the reference signal 210 transmitted in the first symbol position following the control region may be preconfigured and therefore known by all communicating devices. The symbol position(s) of other reference signals 210 being communicated in the TTI, however, may not be known beforehand and may therefore be signaled in accordance with aspects of the present disclosure.

Each slot configuration 200 may include a data channel that includes a plurality of data signals 215. The size of the data channel (e.g., the number of symbol positions being used for the data communications) may be flexible and may include symbol positions used for communicating reference signals 210. Each slot configuration 200 may also include one or more unused symbols 220, which do not include data or reference signal communications.

Generally, a base station may select or otherwise identify a resource grant for the UE to use for data communications, e.g., uplink or downlink communications. The resource grant may include the resources of the slot configuration 200 that are being used for communicating data signals 215, which may also include the plurality of symbol positions being used for communicating reference signals 210. The base station may transmit the resource grant to the UE, e.g., in a control signal of the control region, such as a physical downlink control channel (PDCCH) signal. The base station may also transmit an indication of a control signal configuration and an end symbol index that are associated with the resource grant. The base station may transmit the indication of the control signal configuration and the end symbol index in the resource grant, or in other signaling. For example, in some aspects the indication may also be transmitted in a higher layer signaling, e.g., such as RRC signaling.

In some aspects, the control signal configuration may provide an indication of the number of symbol positions being used to transmit control resources 205 in the control region, e.g., one, two, three, or some other number of symbol positions. In some aspects, the end symbol index may indicate the index of the last symbol position in the resource grant, e.g., the last symbol position assigned for the data signal 215 and/or reference signal 210 communications. The UE may use the indication received from the base station to identify the plurality of symbol positions in the TTI that are used to transmit reference signals 210 in conjunction with the data signals 215.

In some aspects, the slot configurations 200 may form a set of reference signal configurations, e.g., may constitute a set of available reference signal configurations. The set of reference signal configurations may be known by all communicating devices, e.g., may be preconfigured and/or may be signaled during a connection establishment procedure. Thus, in some aspects the indication from the base station with regards to the end symbol index may be a bit or flag associated with at least one reference signal configuration from the set of reference signal configurations. In some aspects, the UE may also use the control signal configuration to identify the plurality of symbol positions being used for communicating the reference signals 210.

Figure 2A:
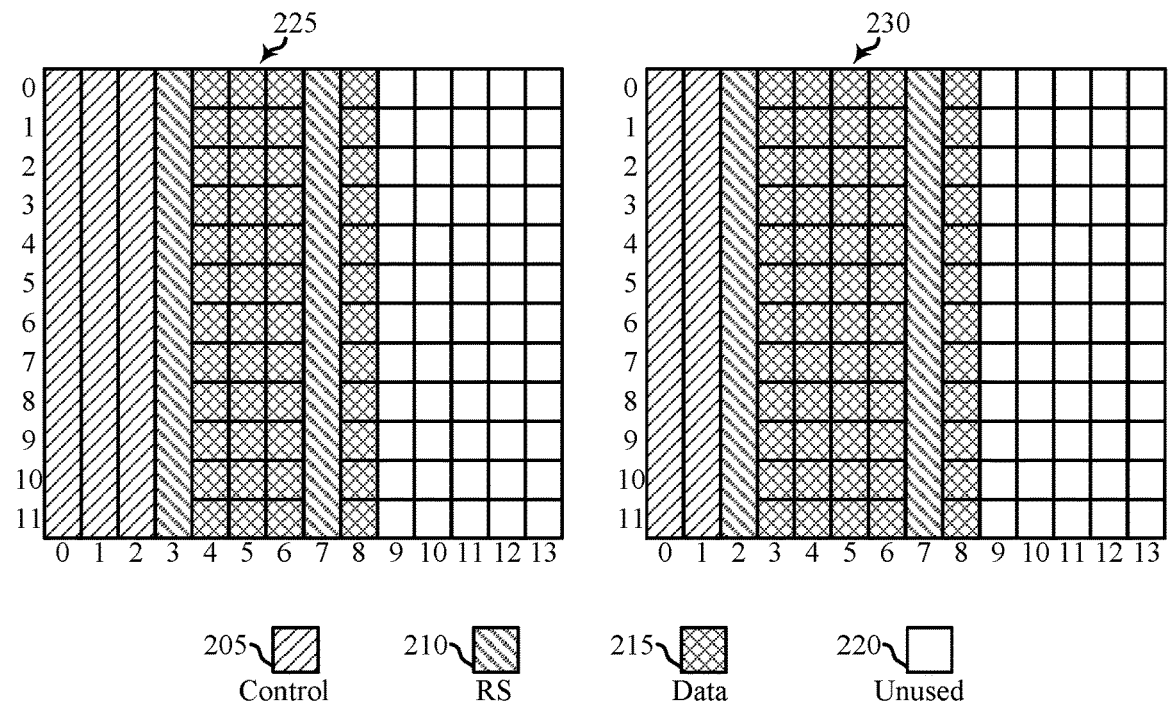
FIGS. 2A-2F illustrate examples of slot configurations that support determination of reference signal patterns in accordance with aspects of the present disclosure.

Referring to slot configuration 200-a of FIG. 2A, the end symbol index may indicate that the last symbol position allocated in the resource grant is eight, meaning that the symbol position eight corresponds to the last symbol position available for communications. Moreover, the control signal indication may identify the number of symbol positions being used for communicating control resources 205. In the slot configuration 225, the control signal configuration may indicate that three symbol positions are being used to communicate control resources 205. In the slot configuration 230, the control signal configuration may indicate that two symbol positions are being used to communicate control resources 205. The UE may use this information to access a listing of the set of available reference signal configurations to identify the plurality of symbol positions being used for communicating the reference signals 210. For example, the UE may know that, based on the control signal configuration and the end symbol index, that the reference signals 210 are being transmitted in symbol positions three and seven (for slot configuration 225) and in symbol positions two and seven (for slot configuration 230). That is, the UE may know that, for a control signal configuration with three symbol positions and for an end symbol index of eight, the reference signal configuration indicates that the reference signals 210 are being transmitted in symbol positions three and seven, as is shown in slot configuration 225. Further, the UE may know that, for a control signal configuration with two symbol positions and for an end symbol index of eight, the reference signal configuration indicates that the reference signals 210 are being transmitted in symbol positions two and seven, as is shown in slot configuration 230.

Figure 2B:
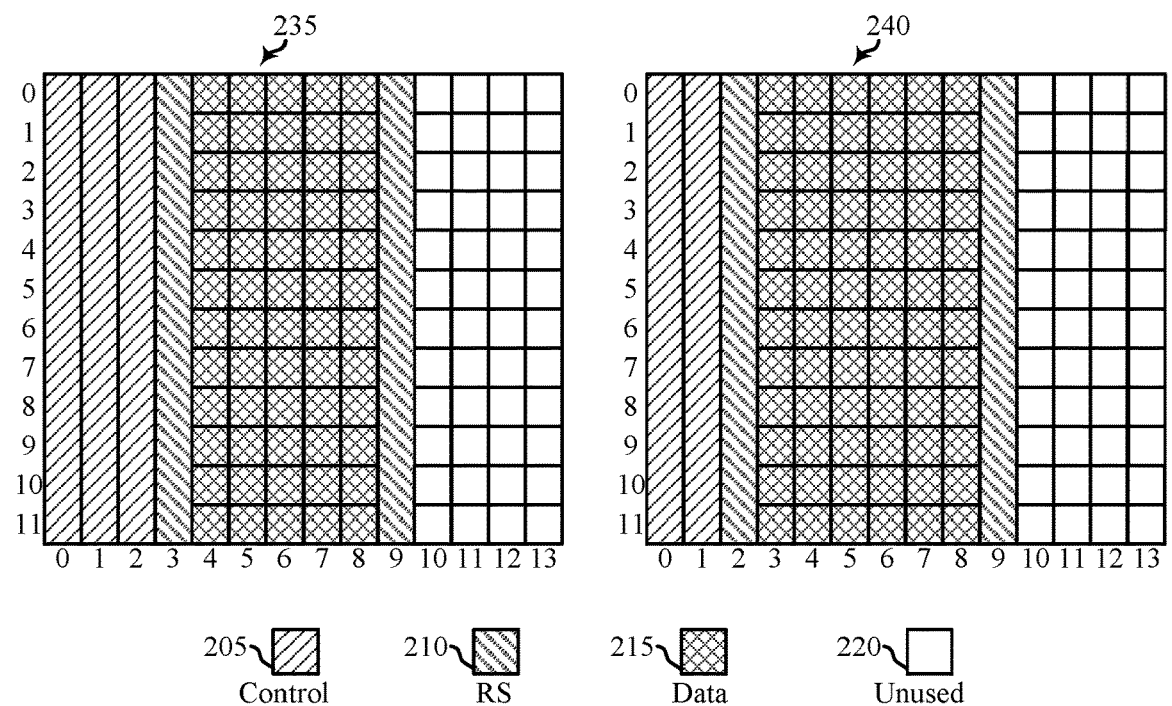

Referring to slot configuration 200-b of FIG. 2B, the end symbol index may indicate that the last symbol position allocated in the resource grant is nine, meaning that the symbol position nine corresponds to the last symbol position available for communications. Moreover, the control signal indication may identify the number of symbol positions being used for communicating control resources 205. In the slot configuration 235, the control signal configuration may indicate that three symbol positions are being used to communicate control resources 205. In the slot configuration 240, the control signal configuration may indicate that two symbol positions are being used to communicate control resources 205. The UE may use this information to access a listing of the set of available reference signal configurations to identify the plurality of symbol positions being used for communicating the reference signals 210. For example, the UE may know that, based on the control signal configuration and the end symbol index, that the reference signals 210 are being transmitted in symbol positions three and nine (for slot configuration 235) and in symbol positions two and nine (for slot configuration 240). That is, the UE may know that, for a control signal configuration with three symbol positions and for an end symbol index of nine, the reference signal configuration indicates that the reference signals 210 are being transmitted in symbol positions three and nine, as is shown in slot configuration 235. Further, the UE may know that, for a control signal configuration with two symbol positions and for an end symbol index of nine, the reference signal configuration indicates that the reference signals 210 are being transmitted in symbol positions two and nine, as is shown in slot configuration 240.

Figure 2C:
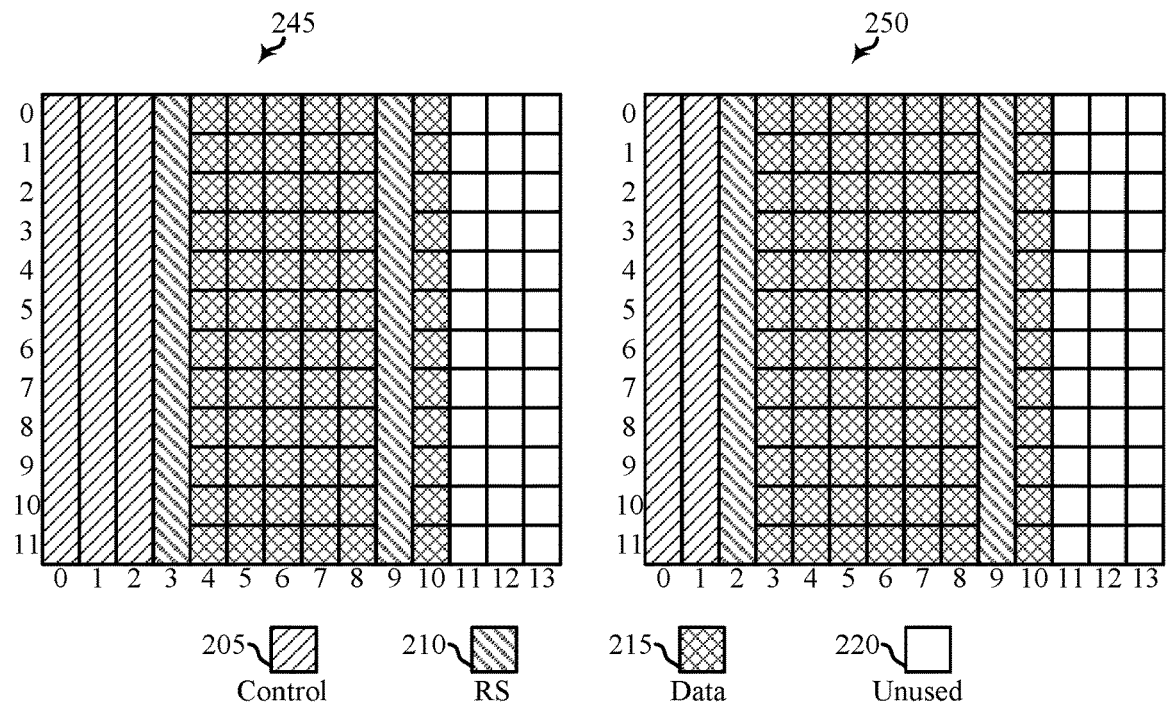

Referring to slot configuration 200-c of FIG. 2C, the end symbol index may indicate that the last symbol position allocated in the resource grant is ten, meaning that the symbol position ten corresponds to the last symbol position available for communications. Moreover, the control signal indication may identify the number of symbol positions being used for communicating control resources 205. In the slot configuration 245, the control signal configuration may indicate that three symbol positions are being used to communicate control resources 205. In the slot configuration 250, the control signal configuration may indicate that two symbol positions are being used to communicate control resources 205. The UE may use this information to access a listing of the set of available reference signal configurations to identify the plurality of symbol positions being used for communicating the reference signals 210. For example, the UE may know that, based on the control signal configuration and the end symbol index, that the reference signals 210 are being transmitted in symbol positions three and nine (for slot configuration 245) and in symbol positions two and nine (for slot configuration 250). That is, the UE may know that, for a control signal configuration with three symbol positions and for an end symbol index of ten, the reference signal configuration indicates that the reference signals 210 are being transmitted in symbol positions three and nine, as is shown in slot configuration 245. Further, the UE may know that, for a control signal configuration with two symbol positions and for an end symbol index of ten, the reference signal configuration indicates that the reference signals 210 are being transmitted in symbol positions two and nine, as is shown in slot configuration 250.

Figure 2D:
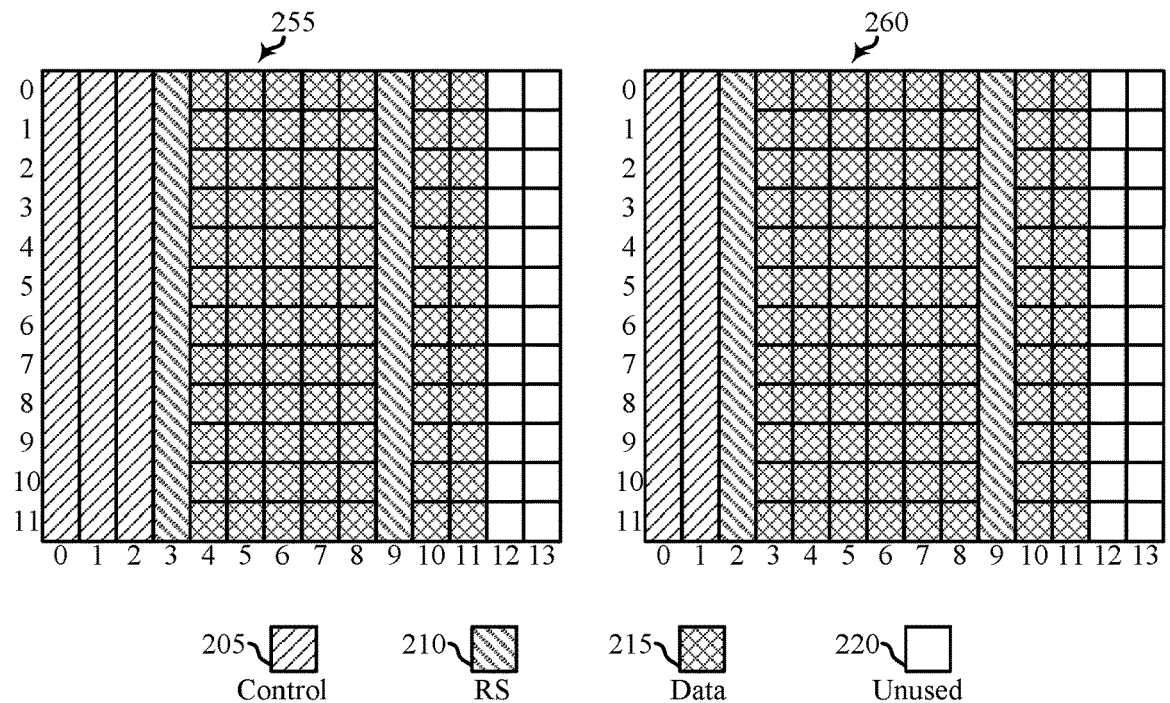

Referring to slot configuration 200-d of FIG. 2D, the end symbol index may indicate that the last symbol position allocated in the resource grant is eleven, meaning that the symbol position eleven corresponds to the last symbol position available for communications. Moreover, the control signal indication may identify the number of symbol positions being used for communicating control resources 205. In the slot configuration 255, the control signal configuration may indicate that three symbol positions are being used to communicate control resources 205. In the slot configuration 260, the control signal configuration may indicate that two symbol positions are being used to communicate control resources 205. The UE may use this information to access a listing of the set of available reference signal configurations to identify the plurality of symbol positions being used for communicating the reference signals 210. For example, the UE may know that, based on the control signal configuration and the end symbol index, that the reference signals 210 are being transmitted in symbol positions three and nine (for slot configuration 255) and in symbol positions two and nine (for slot configuration 260). That is, the UE may know that, for a control signal configuration with three symbol positions and for an end symbol index of eleven, the reference signal configuration indicates that the reference signals 210 are being transmitted in symbol positions three and nine, as is shown in slot configuration 255. Further, the UE may know that, for a control signal configuration with two symbol positions and for an end symbol index of eleven, the reference signal configuration indicates that the reference signals 210 are being transmitted in symbol positions two and nine, as is shown in slot configuration 260.

Figure 2E:
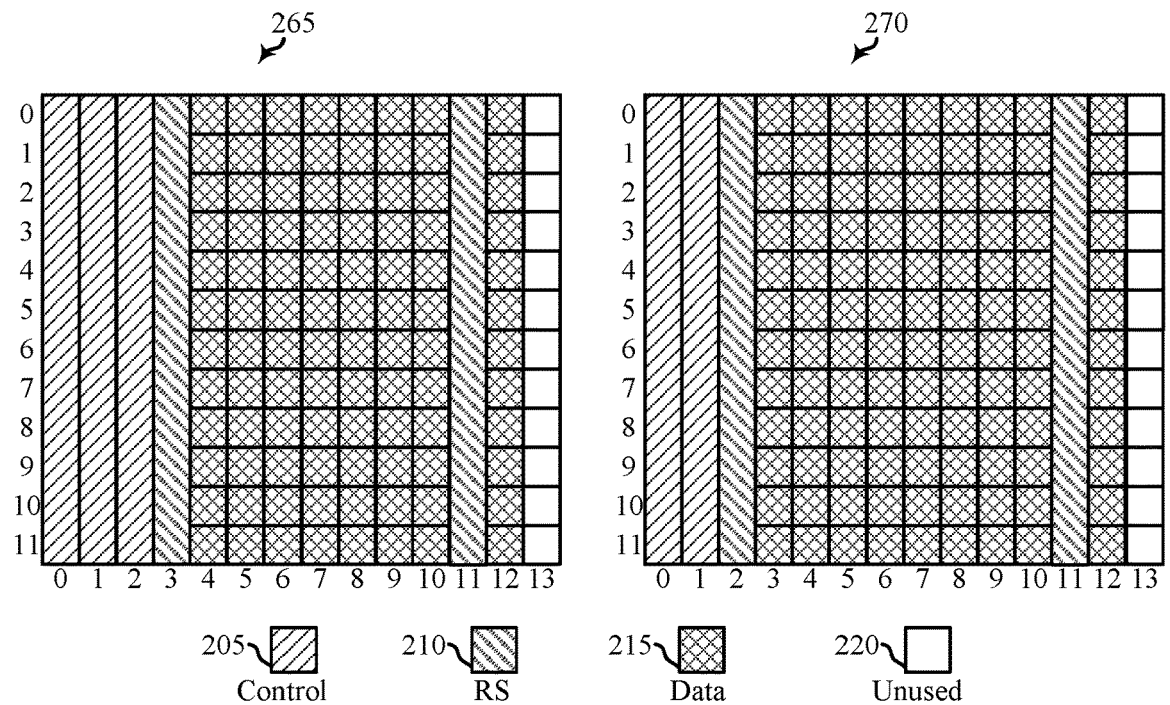

Referring to slot configuration 200-e of FIG. 2E, the end symbol index may indicate that the last symbol position allocated in the resource grant is twelve, meaning that the symbol position twelve corresponds to the last symbol position available for communications. Moreover, the control signal indication may identify the number of symbol positions being used for communicating control resources 205. In the slot configuration 265, the control signal configuration may indicate that three symbol positions are being used to communicate control resources 205. In the slot configuration 270, the control signal configuration may indicate that two symbol positions are being used to communicate control resources 205. The UE may use this information to access a listing of the set of available reference signal configurations to identify the plurality of symbol positions being used for communicating the reference signals 210. For example, the UE may know that, based on the control signal configuration and the end symbol index, that the reference signals 210 are being transmitted in symbol positions three and eleven (for slot configuration 265) and in symbol positions two and eleven (for slot configuration 270). That is, the UE may know that, for a control signal configuration with three symbol positions and for an end symbol index of twelve, the reference signal configuration indicates that the reference signals 210 are being transmitted in symbol positions three and eleven, as is shown in slot configuration 265. Further, the UE may know that, for a control signal configuration with two symbol positions and for an end symbol index of twelve, the reference signal configuration indicates that the reference signals 210 are being transmitted in symbol positions two and eleven, as is shown in slot configuration 270.

Figure 2F:
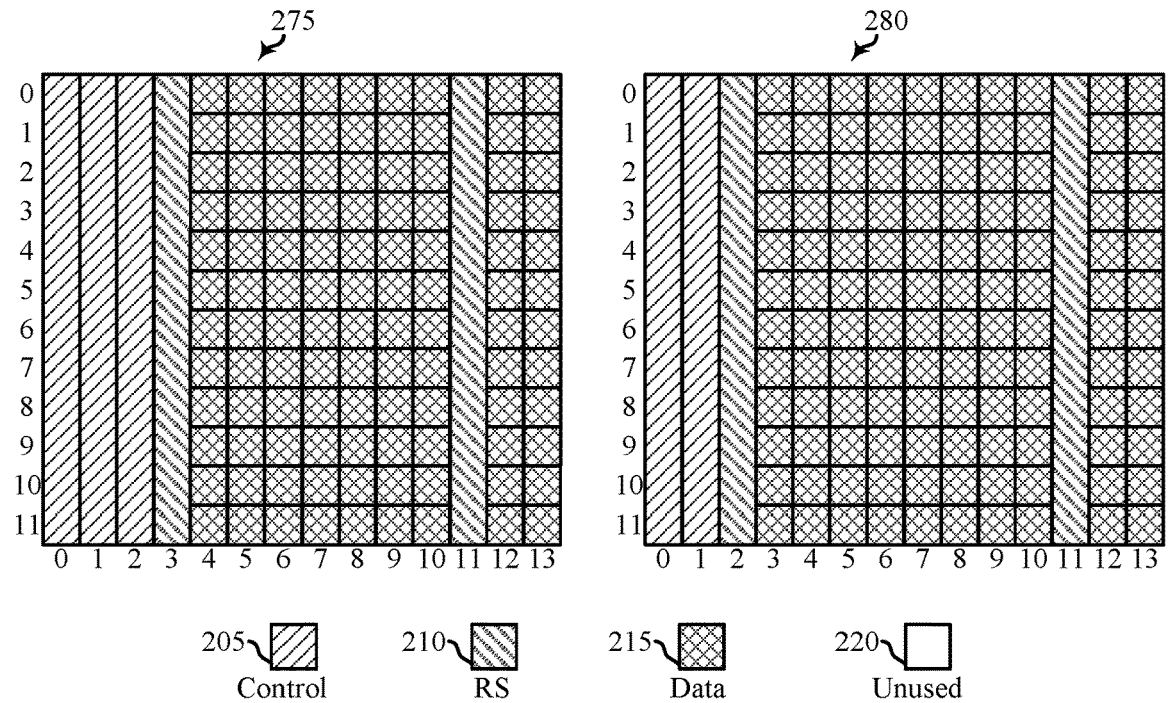

Referring to slot configuration 200-*f* of FIG. 2F, the end symbol index may indicate that the last symbol position allocated in the resource grant is thirteen, meaning that the symbol position thirteen corresponds to the last symbol position available for communications. Moreover, the control signal indication may identify the number of symbol positions being used for communicating control resources 205. In the slot configuration 275, the control signal configuration may indicate that three symbol positions are being used to communicate control resources 205. In the slot configuration 280, the control signal configuration may indicate that two symbol positions are being used to communicate control resources 205. The UE may use this information to access a listing of the set of available reference signal configurations to identify the plurality of symbol positions being used for communicating the reference signals 210. For example, the UE may know that, based on the control signal configuration and the end symbol index, that the reference signals 210 are being transmitted in symbol positions three and eleven (for slot configuration 275) and in symbol positions two and eleven (for slot configuration 280). That is, the UE may know that, for a control signal configuration with three symbol positions and for an end symbol index of thirteen, the reference signal configuration indicates that the reference signals 210 are being transmitted in symbol positions three and eleven, as is shown in slot configuration 275. Further, the UE may know that, for a control signal configuration with two symbol positions and for an end symbol index of thirteen, the reference signal configuration indicates that the reference signals 210 are being transmitted in symbol positions two and eleven, as is shown in slot configuration 280.

In some aspects, the symbol position corresponding to the last reference signal 210 may be multiplexed with data signals 215 or may be used solely for communicating the reference signals 210. That is and for slot configuration 235, the symbol position nine may be used for communicating the reference signals 210 (as is shown in FIG. 2B) or may be multiplexed with data signals 215. For example, the UE may determine whether any resource elements are available in the symbol position and, if so, FDM the data signals 215 with the reference signals 210 in the symbol position. If the data signals 215 are FDM'd with the reference signals 210 in the symbol position, the data signals 215 may be rate matched around the reference signals 210 or other transmissions.

Figure 3A:
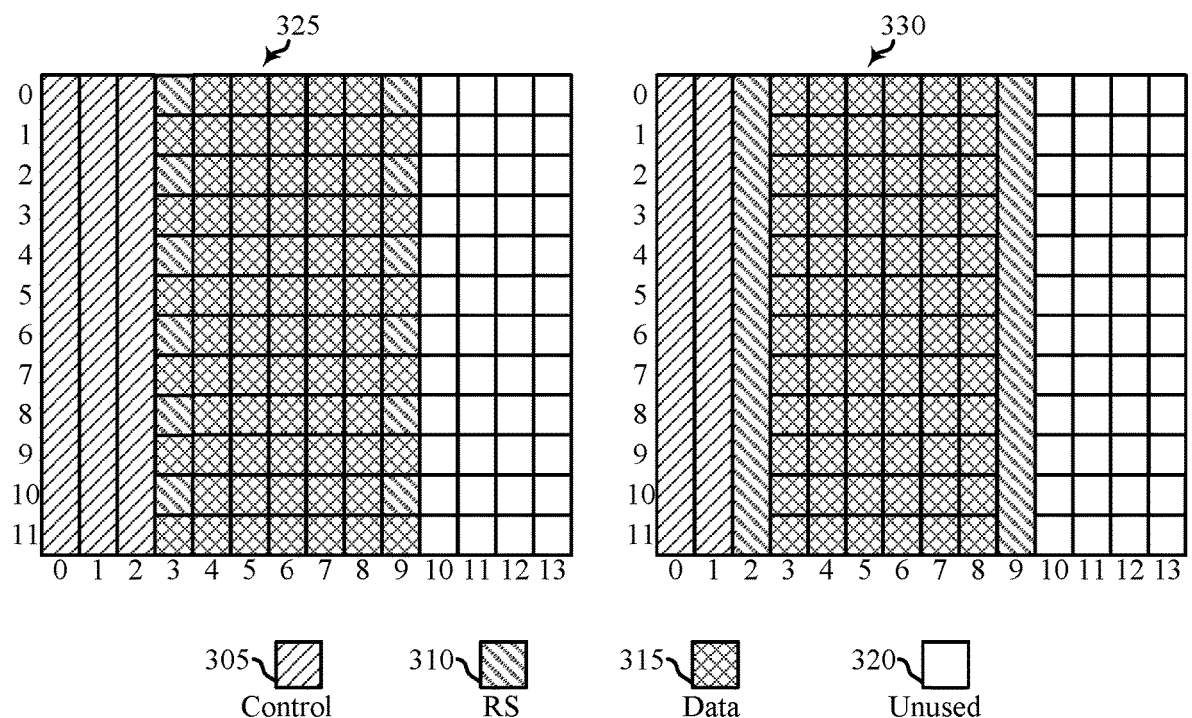
FIGS. 3A and 3B illustrate examples of slot configurations that support determination of reference signal patterns in accordance with aspects of the present disclosure.
Figure 3B:
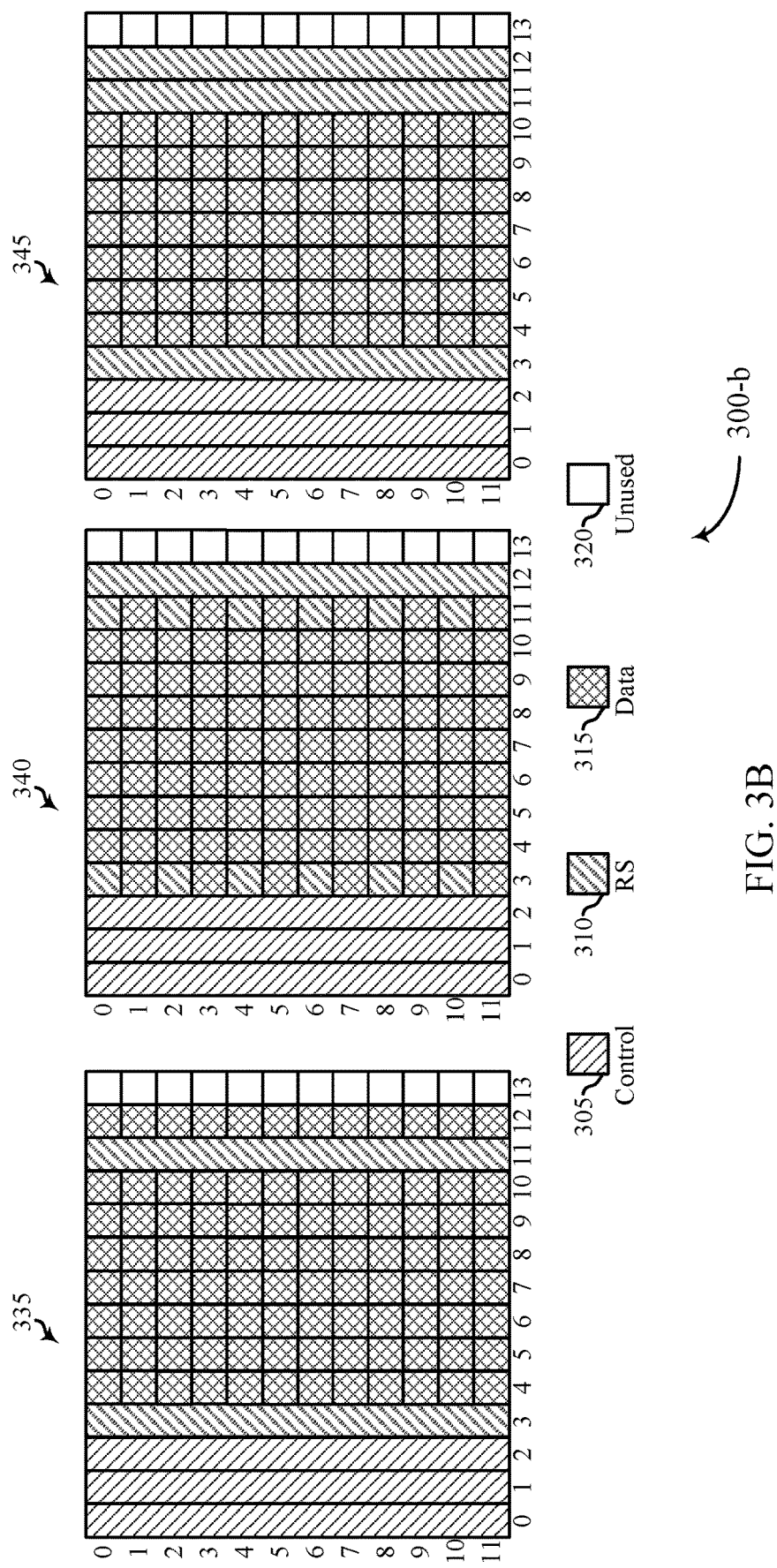

FIGS. 3A and 3B illustrate examples of slot configurations 300 that support determination of reference signal patterns in accordance with various aspects of the present disclosure. In some examples, slot configurations 300 may implement aspects of wireless communication system 100 and/or slot configurations 200. Aspects of slot configurations 300 may be implemented by a UE and/or a base station, which may be examples of the corresponding devices described herein.

Generally, slot configurations 300 illustrate an example of a TTI which may be utilized in accordance with aspects of the present disclosure. In the example slot configurations 300, the TTI may refer to a slot. Each slot configuration 300 may include a plurality of symbols (shown along the vertical axis), with fourteen symbols (labeled 0-13) being shown by way of example only. Each slot configuration 300 may include a plurality of channels (shown along the horizontal axis), with 12 channels (labeled 0-11) being shown by way of example only. It is to be understood that a TTI is not limited to a slot, and instead may include a mini-slot, a subframe, a frame, and the like. Moreover, it is also to be understood that, when the TTI is a slot, that the slot may differ in terms of symbols and/or channels from the slot configurations 300.

Each slot configuration 300 may include a control region that includes a plurality of control resources 305. In some aspects, the control region may be defined by a control signal configuration signaled from the base station to a UE. In some examples, the control region includes the first one, two, or three symbols positions of the slot configuration 300.

Each slot configuration 300 may include reference signal(s) 310 being communicated in a plurality of symbol positions in the slot configuration 300. It is to be understood that references to a reference signal 310 may refer to any non-data signal, such as a DMRS, CSI-RS, PSS, SSS, PRACH signal, and the like. In some examples, the symbol position immediately following the control region may include a reference signal 310, e.g., the reference signal 310 may be front loaded, which may be fixed or otherwise known by all devices. That is, the reference signal 310 transmitted in the first symbol position following the control region may be preconfigured and therefore known by all communicating devices. The symbol position(s) of other reference signals 310 being communicated in the TTI, however, may not be known beforehand and may therefore be signaled in accordance with aspects of the present disclosure.

Each slot configuration 300 may include a data channel that includes a plurality of data signals 315. The size of the data channel (e.g., the number of symbol positions being used for the data communications) may be flexible and may include symbol positions used for communicating reference signals 310. Each slot configuration 300 may also include one or more unused symbols 320, which do not include data or reference signal communications.

Generally, a base station may select or otherwise identify a resource grant for the UE to use for data communications, e.g., uplink or downlink communications. The resource grant may include the resources of the slot configurations 300 that are being used for communicating data signals 315, which may also include the plurality of symbol positions being used for communicating reference signals 310. The base station may transmit the resource grant to the UE, e.g., in a control signal of the control region, such as a PDCCH signal. The base station may also transmit an indication of the control signal configuration and an end symbol index that are associated with the resource grant. The base station may transmit the indication of the control signal configuration and the end symbol index in the resource grant, or in other signaling. For example, in some aspects the indication may also be transmitted in a higher layer signaling, e.g., such as RRC signaling.

In some aspects, the control signal configuration may provide an indication of the number of symbol positions being used to transmit control resources 305 in the control region, e.g., one, two, three, or some other number of symbol positions. In some aspects, the end symbol index may indicate the position of the last data symbol in the TTI being used for communicating data signals 315. The UE may use the indication received from the base station to identify the plurality of symbol positions in the TTI that are used to transmit reference signals 310 in conjunction with the data signals 315.

In some aspects, the base station may also send an additional indication that provides an indication of the last symbol position that is relative to the end symbol index. For example, the end symbol index may indicate that a particular symbol position is the last symbol position available for communications (e.g., based on the resource grant) and the last symbol position may indicate a symbol position relative to the end symbol position that can be used for communicating a reference signal 310. In some aspects, the additional indication may indicate whether the reference signal 310 is to be communicated before or after the end symbol index and/or whether the reference signal 310 and the data signal 315 are to be multiplexed in any symbol position. In some aspects, the additional indication may be received in a bit field of a DCI signal to indicate whether the last reference signal 310 is located on the left (e.g., before) or the right (e.g., after) the end symbol index. In some aspects, the additional indication may be received in a field or a parameter of a higher layer configuration signal to indicate whether the last reference signal 310 is located on the left (e.g., before) or the right (e.g., after) the end symbol index.

Thus, in some aspects the communicating devices may not be preconfigured with a set of available reference signal configuration and, instead, the UE may determine the plurality of symbol positions being used to communicate reference signals 310 based on the initial indication from the base station in conjunction with the additional indication. That is, the ending symbol index may refer to the last symbol position that actual data signal 315 is communicated in and the additional indication may provide an indication of whether the final reference signal 310 is communicated in the symbol position immediately before or after the ending symbol index and/or whether the data signal 315 is multiplexed with the reference signals 310.

Referring to slot configuration 300-a of FIG. 3A, in slot configuration 325 the end symbol index may indicate that the last symbol position allocated in the resource grant is nine, meaning that the symbol position nine corresponds to the last symbol position available for communicating data signals 315. In the slot configuration 325, the control signal configuration may indicate that two symbol positions are being used to communicate control resources 305. The additional indication received from the base station may indicate that the reference signals 310 are multiplexed with the data signals 315 in the symbol position nine.

In slot configuration 330 the end symbol index may indicate that the last symbol position allocated in the resource grant is eight, meaning that the symbol position eight corresponds to the last symbol position available for communicating data signals 315. In the slot configuration 330, the control signal configuration may indicate that two symbol positions are being used to communicate control resources 305. The additional indication received from the base station may indicate that the reference signals 310 are communicated in the symbol position immediately following the end symbol index, i.e., symbol position nine. The additional indication received from the base station may indicate that the data signal 315 and the reference signal 310 are not multiplexed in the end symbol index.

Referring to slot configuration 300-b of FIG. 3B, in slot configuration 335 the end symbol index may indicate that the last symbol position allocated in the resource grant is twelve, meaning that the symbol position twelve corresponds to the last symbol position available for communicating data signals 315. In the slot configuration 335, the control signal configuration may indicate that two symbol positions are being used to communicate control resources 305. The additional indication received from the base station may indicate that the reference signals 310 are communicated in the symbol position immediately before the end symbol index, i.e., symbol position eleven. The additional indication received from the base station may indicate that the data signal 315 and the reference signal 310 are not multiplexed in the end symbol index.

In slot configuration 340 the end symbol index may indicate that the last symbol position allocated in the resource grant is eleven, meaning that the symbol position eleven corresponds to the last symbol position available for communicating data signals 315. In the slot configuration 340, the control signal configuration may indicate that three symbol positions are being used to communicate control resources 305. The additional indication received from the base station may indicate that the reference signals 310 are communicated in the same symbol position as the end symbol index, i.e., symbol position eleven. The additional indication received from the base station may indicate that the data signal 315 and the reference signal 310 are multiplexed in the end symbol index. Additionally, the additional indication received from the base station may also indicate that the data signal 315 and the reference signal 310 are multiplexed in the front loaded symbol position, i.e., symbol position three immediately following the control region. Moreover, the additional indication received from the base station may also indicate that an additional symbol position is being used to communicate reference signal 310 (e.g., a CSI-RS) in the symbol position immediately following the end symbol index, i.e., symbol position twelve.

In slot configuration 345 the end symbol index may indicate that the last symbol position allocated in the resource grant is ten, meaning that the symbol position ten corresponds to the last symbol position available for communicating data signals 315. In the slot configuration 345, the control signal configuration may indicate that three symbol positions are being used to communicate control resources 305. The additional indication received from the base station may indicate that the reference signals 310 are communicated in the symbol position immediately following the end symbol index, i.e., symbol position eleven. The additional indication received from the base station may indicate that the data signal 315 and the reference signal 310 are not multiplexed in the end symbol index. Additionally, the additional indication received from the base station may also indicate that an additional symbol position is being used to communicate reference signal 310 (e.g., a CSI-RS) in the symbol position immediately following the end symbol index, i.e., symbol position twelve.

Figure 4:
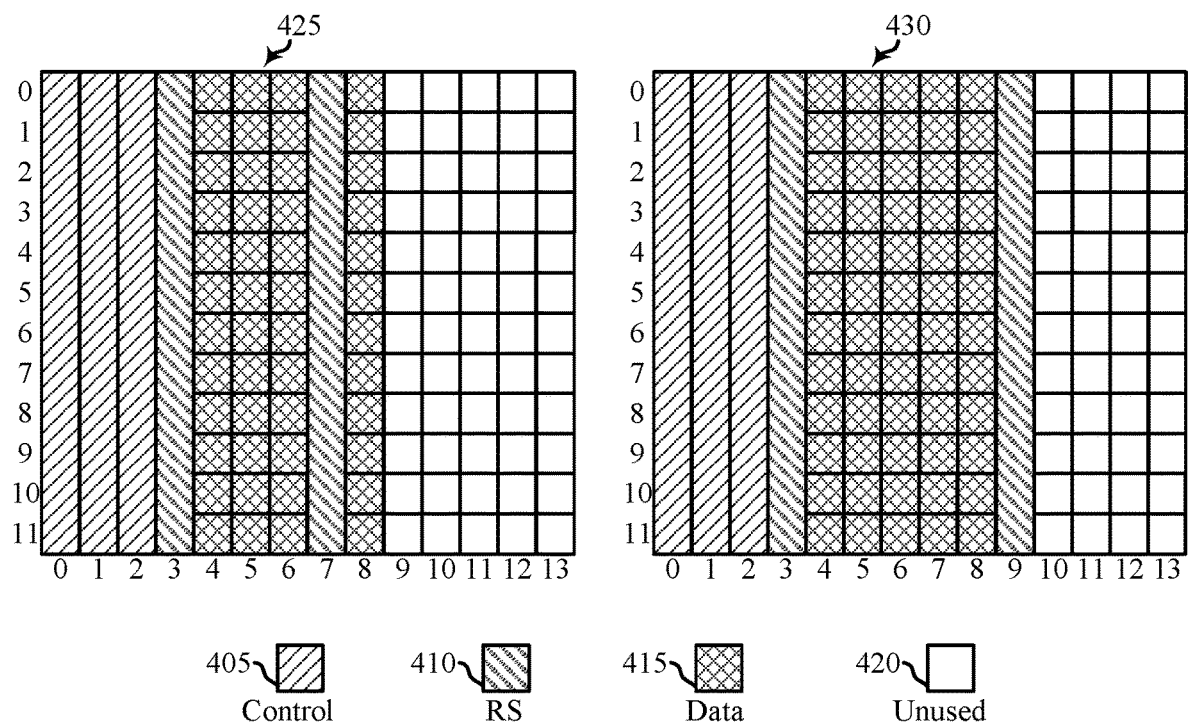
FIG. 4 illustrates an example of a slot configuration that supports determination of reference signal patterns in accordance with aspects of the present disclosure.

FIG. 4 illustrates an example of a slot configuration 400 that supports determination of reference signal patterns in accordance with various aspects of the present disclosure. In some examples, slot configuration 400 may implement aspects of wireless communication system 100 and/or slot configurations 200/300. Aspects of slot configuration 400 may be implemented by a UE and/or a base station, which may be examples of the corresponding devices described herein.

Generally, slot configuration 400 illustrates an example of a TTI which may be utilized in accordance with aspects of the present disclosure. In the example slot configuration 400, the TTI may refer to a slot. Each slot configuration 400 may include a plurality of symbols (shown along the vertical axis), with fourteen symbols (labeled 0-13) being shown by way of example only. Each slot configuration 400 may include a plurality of channels (shown along the horizontal axis), with 12 channels (labeled 0-11) being shown by way of example only. It is to be understood that a TTI is not limited to a slot, and instead may include a mini-slot, a subframe, a frame, and the like. Moreover, it is also to be understood that, when the TTI is a slot, that the slot may differ in terms of symbols and/or channels from the slot configuration 400.

Each slot configuration 400 may include a control region that includes a plurality of control signals 405. In some aspects, the control region may be defined by a control signal configuration signaled from the base station to a UE. In some examples, the control region includes the first one, two, or three symbols positions of the slot configuration 400.

Each slot configuration 400 may include reference signal(s) 410 being communicated in a plurality of symbol positions in the slot configuration 400. It is to be understood that references to a reference signal 410 may refer to any non-data signal, such as a DMRS, CSI-RS, PSS, SSS, PRACH signal, and the like. In some examples, the symbol position immediately following the control region may include a reference signal 410, e.g., the reference signal 410 may be front loaded, which may be fixed or otherwise known by all devices. The symbol position(s) of other reference signals 410 being communicated in the TTI, however, may not be known beforehand and may therefore be signaled in accordance with aspects of the present disclosure.

Each slot configuration 400 may include a data channel that includes a plurality of data signals 415. The size of the data channel (e.g., the number of symbol positions being used for the data communications) may be flexible and may include symbol positions used for communicating reference signals 410. Each slot configuration 400 may also include one or more unused symbols 420, which do not include data or reference signal communications.

Generally, a base station may select or otherwise identify a resource grant for the UE to use for data communications, e.g., uplink or downlink communications. The resource grant may include the resources of the slot configuration 400 that are being used for communicating data signals 415, which may also include the plurality of symbol positions being used for communicating reference signals 410. The base station may transmit the resource grant to the UE, e.g., in a control signal 405 of the control region, such as a PDCCH signal. The base station may also transmit an indication of the control signal configuration and an end symbol index that are associated with the resource grant. The base station may transmit the indication of the control signal configuration and the end symbol index in the resource grant, or in other signaling. For example, in some aspects the indication may also be transmitted in a higher layer signaling, e.g., such as RRC signaling.

In some aspects, the control signal configuration may provide an indication of the number of symbol positions being used to transmit control signals 405 in the control region, e.g., one, two, three, or some other number of symbol positions. In some aspects, the end symbol index may indicate the position of the last data symbol in the TTI being used for communicating data signals 415. The UE may use the indication received from the base station to identify the plurality of symbol positions in the TTI that are used to transmit reference signals 410 in conjunction with the data signals 415.

In some aspects, the base station may also send an additional indication that provides an indication of the last symbol position that is relative to the end symbol index. For example, the end symbol index may indicate that a particular symbol position is the last symbol position available for communications (e.g., based on the resource grant) and the last symbol position may indicate a symbol position relative to the end symbol position that can be used for communicating a reference signal 410. For example and referring to slot configurations 425 and 430, the end symbol index for both slot configurations may be eight, meaning that symbol position eight is the last symbol position available for communications. However, the reference signal 410 may be transmitted either before (as shown in slot configuration 425) or after (as shown in slot configuration 430) the end symbol index. Thus, the base station simply communicating the end symbol index, without other preconfigured or signaled information, may result in confusion as to whether the final reference signal 410 may be communicated in the TTI.

Thus, the additional indication may indicate whether the reference signal 410 is to be communicated before or after the end symbol index. In some aspects, the additional indication may be received in a bit or field of a DCI signal to indicate whether the last reference signal 410 is located on the left (e.g., before) or the right (e.g., after) the end symbol index. In some aspects, the additional indication may be received in a field or a parameter of a higher layer configuration signal to indicate whether the last reference signal 410 is located on the left (e.g., before) or the right (e.g., after) the end symbol index. In the slot configuration 425, the additional signaling may indicate that the last reference signal 410 is communicated in the symbol position before the end symbol index, e.g., symbol position seven. In the slot configuration 430, the additional signaling may indicate that the last reference signal 410 is communicated in the symbol position after the end symbol index, e.g., symbol position nine.

Figure 5:
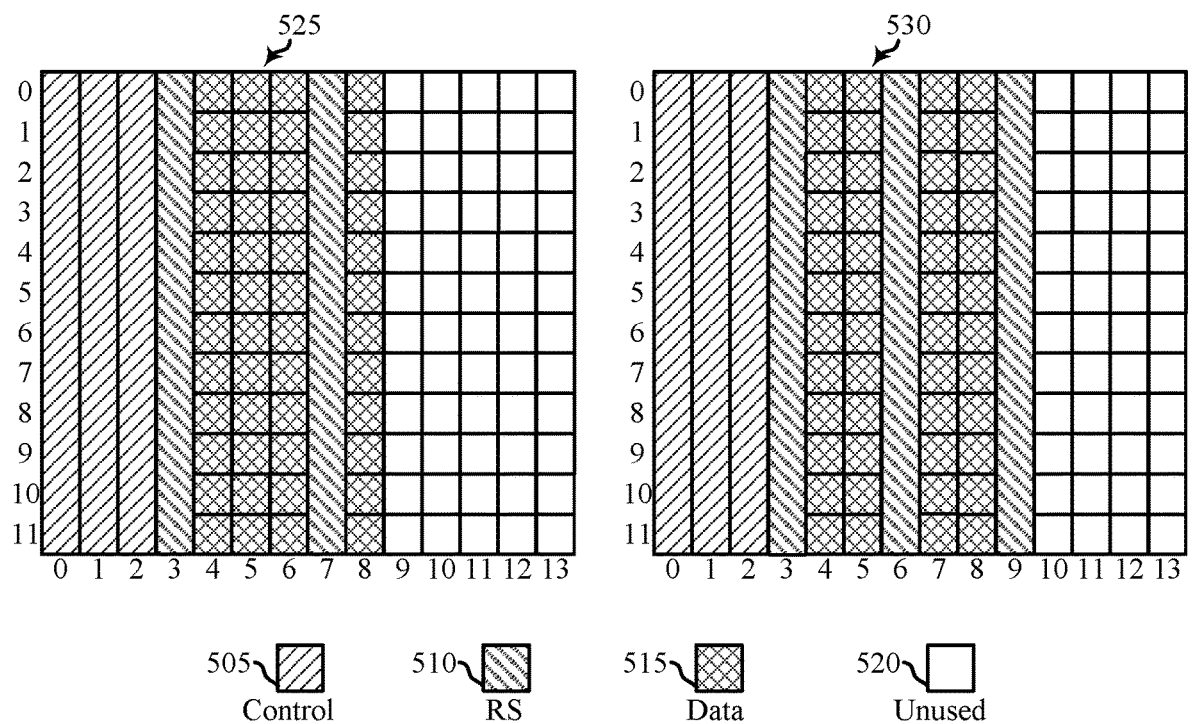
FIG. 5 illustrates an example of a slot configuration that supports determination of reference signal patterns in accordance with aspects of the present disclosure.

FIG. 5 illustrates an example of a slot configuration 500 that supports determination of reference signal patterns in accordance with various aspects of the present disclosure. In some examples, slot configurations 500 may implement aspects of wireless communication system 100 and/or slot configurations 200/300/400. Aspects of slot configuration 500 may be implemented by a UE and/or a base station, which may be examples of the corresponding devices described herein.

Generally, slot configuration 500 illustrates an example of a TTI which may be utilized in accordance with aspects of the present disclosure. In the example slot configurations 500, the TTI may refer to a slot. Each slot configuration 500 may include a plurality of symbols (shown along the vertical axis), with fourteen symbols (labeled 0-13) being shown by way of example only. Each slot configuration 500 may include a plurality of channels (shown along the horizontal axis), with 12 channels (labeled 0-11) being shown by way of example only. It is to be understood that a TTI is not limited to a slot, and instead may include a mini-slot, a subframe, a frame, and the like. Moreover, it is also to be understood that, when the TTI is a slot, that the slot may differ in terms of symbols and/or channels from the slot configuration 500.

Each slot configuration 500 may include a control region that includes a plurality of control signals 505. In some aspects, the control region may be defined by a control signal configuration signaled from the base station to a UE. In some examples, the control region includes the first one, two, or three symbols positions of the slot configuration 500.

Each slot configuration 500 may include reference signal(s) 510 being communicated in a plurality of symbol positions in the slot configuration 500. It is to be understood that references to a reference signal 510 may refer to any non-data signal, such as a DMRS, CSI-RS, PSS, SSS, PRACH signal, and the like. In some examples, the symbol position immediately following the control region may include a reference signal 510, e.g., the reference signal 510 may be front loaded, which may be fixed or otherwise known by all devices. The symbol position(s) of other reference signals 510 being communicated in the TTI, however, may not be known beforehand and may therefore be signaled in accordance with aspects of the present disclosure.

Each slot configuration 500 may include a data channel that includes a plurality of data signals 515. The size of the data channel (e.g., the number of symbol positions being used for the data communications) may be flexible and may include symbol positions used for communicating reference signals 510. Each slot configuration 500 may also include one or more unused symbols 520, which do not include data or reference signal communications.

Generally, a base station may select or otherwise identify a resource grant for the UE to use for data communications, e.g., uplink or downlink communications. The resource grant may include the resources of the slot configurations 500 that are being used for communicating data signals 515, which may also include the plurality of symbol positions being used for communicating reference signals 510. The base station may transmit the resource grant to the UE, e.g., in a control signal 505 of the control region, such as a PDCCH signal. The base station may also transmit an indication of the control signal configuration and an end symbol index that are associated with the resource grant. The base station may transmit the indication of the control signal configuration and the end symbol index in the resource grant, or in other signaling. For example, in some aspects the indication may also be transmitted in a higher layer signaling, e.g., such as RRC signaling.

In some aspects, the control signal configuration may provide an indication of the number of symbol positions being used to transmit control signals 505 in the control region, e.g., one, two, three, or some other number of symbol positions. In some aspects, the end symbol index may indicate the position of the last data symbol in the TTI being used for communicating data signals 515. The UE may use the indication received from the base station to identify the plurality of symbol positions in the TTI that are used to transmit reference signals 510 in conjunction with the data signals 515.

Generally, the configuration for communicating the reference signals 510 in a TTI may be hierarchal. For example, the total number of reference signals 510 being communicated in a TTI may be determined by a higher layer function (e.g., RRC signaling). Given the number of reference signals 510 being communicated in a TTI, the pattern (e.g., reference signal configuration) for communicating the reference signals 510 may be determined and signaled at a lower layer (e.g., L1/L2 or DCI signaling). However, the configuration by the higher layer may occur over a relatively large time scale (e.g., in a semi-static manner), while the configuration of the reference signal 510 pattern may occur more dynamically (e.g., on a per TTI or slot basis). Due to the difference in the time scale, the flexibility of the reference signal 510 configuration may be limited. For example, minimum data channel duration or the end symbol index may be related to the number of reference signals 510 being communicated in the TTI. As shown in slot configuration 525, the number of reference signals 510 being communicated in the TTI is two and the ending symbol index is eight. As shown in the slot configuration 530, the number of reference signals 510 being communicated is three and the ending symbol index is nine.

However, in some instances there may be ambiguity due to inconsistent configurations between the different layers. For example, the L1/L2 signaling (e.g., the additional indication received from the base station) may be inconsistent with the higher layer signaling (e.g., the initial indication received from the base station). As one non-limiting example, the initial indication (e.g., RRC signaling) may indicate that three reference signals 510 are configured to be used, e.g., a reference signal 510 count of three. Although the ending symbol index may be nine with three reference signals 510, the additional signaling (e.g., DCI signaling) may indicate that the ending symbol index is eight. In this case, the number of reference signals 510 that is smaller than the three indicated by the initial indication may be assumed by the UE. For example, the UE may identify a reference signal configuration including two reference signals 510 when the ending symbol index is changed from nine (in the RRC signaling) to eight (in the DCI signaling). That is, when the initial indication indicates three reference signals 510 and an ending symbol index of nine for the TTI (as shown in slot configuration 530), and the additional indication indicates an ending symbol index of eight, the UE may identify two reference signals 510 (a reference signal count of two) to be communicated in the TTI (as shown in slot configuration 525).

Figure 6:
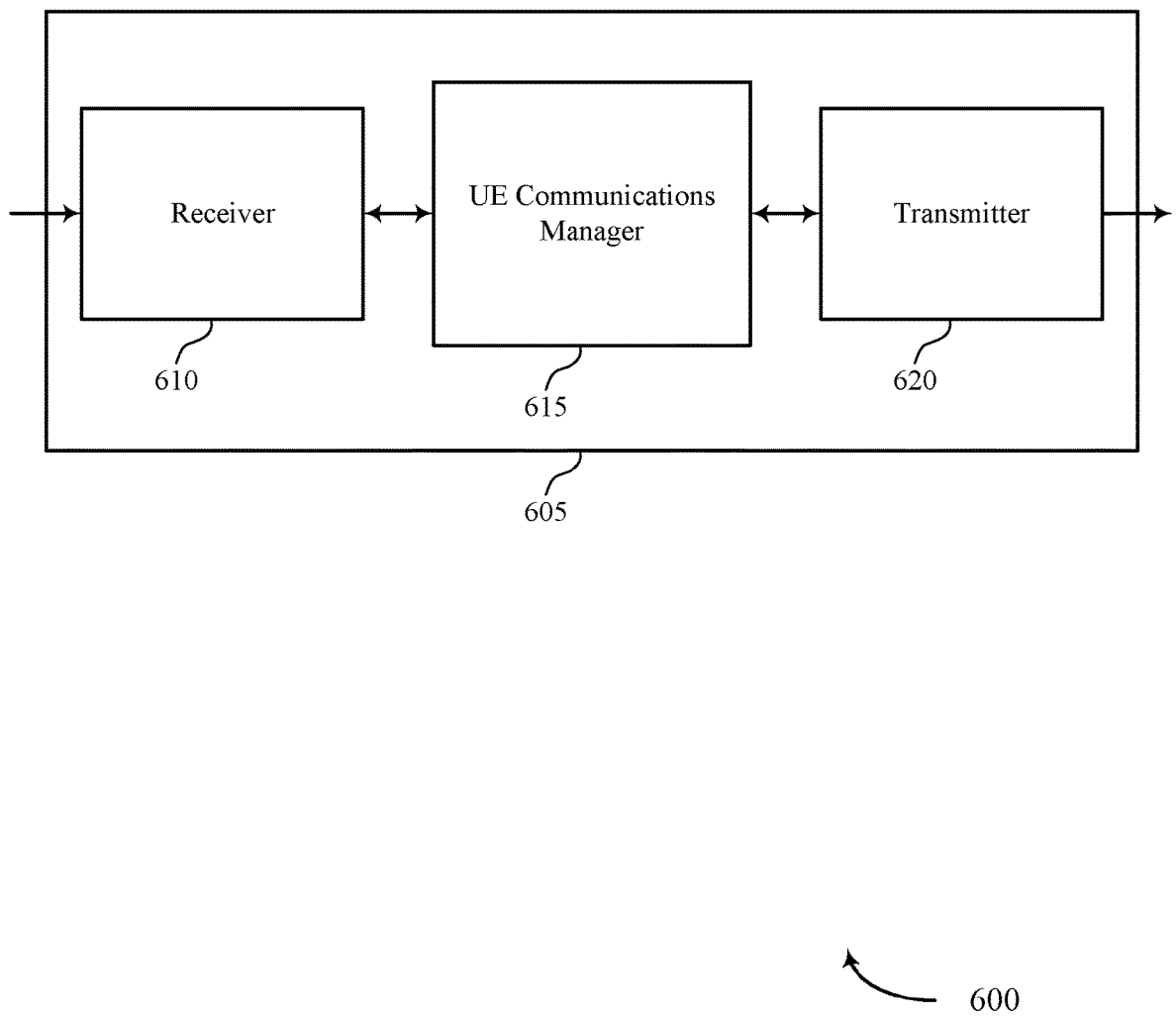
FIGS. 6 through 8 show block diagrams of a device that supports determination of reference signal patterns in accordance with aspects of the present disclosure.

FIG. 6 shows a block diagram 600 of a wireless device 605 that supports determination of reference signal patterns in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to determination of reference signal patterns, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, from a base station, a resource grant for a data communication within a TTI, receive, from the base station, an indication of a control signal configuration and an end symbol index associated with the resource grant, and identify, based on the received indication, a set of symbol positions in the TTI in which reference signals are to be communicated in conjunction with the data communication.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
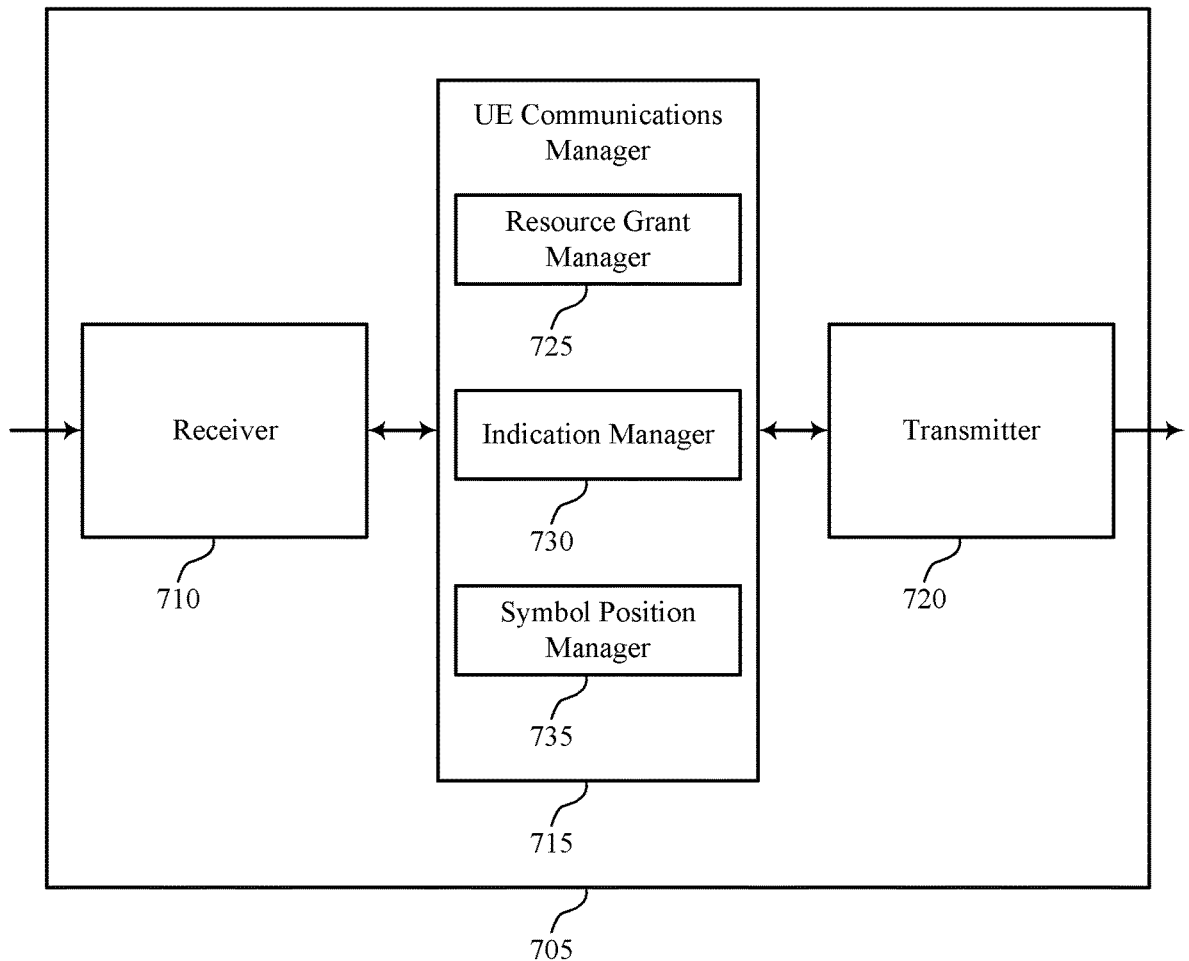

FIG. 7 shows a block diagram 700 of a wireless device 705 that supports determination of reference signal patterns in accordance with aspects of the present disclosure. Wireless device 705 may be an example of aspects of a wireless device 605 or a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to determination of reference signal patterns, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include resource grant manager 725, indication manager 730, and symbol position manager 735.

Resource grant manager 725 may receive, from a base station, a resource grant for a data communication within a TTI.

Indication manager 730 may receive, from the base station, an indication of a control signal configuration and an end symbol index associated with the resource grant.

Symbol position manager 735 may identify, based on the received indication, a set of symbol positions in the TTI in which reference signals are to be communicated in conjunction with the data communication and identify the set of symbol positions based on the selected reference signal configuration. In some cases, identifying the set of symbol positions in the TTI in which reference signals are to be communicated includes: selecting a reference signal configuration for the TTI from a set of reference signal configurations based on the received indication.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
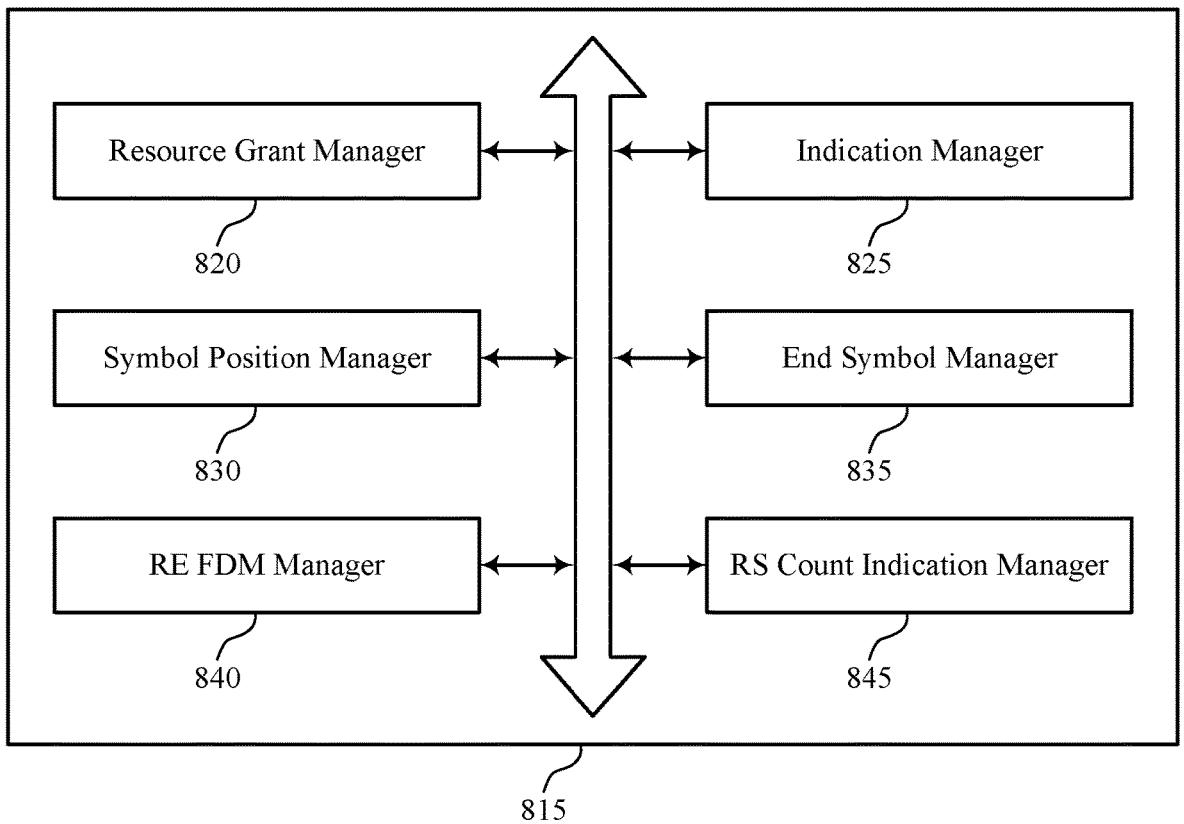

FIG. 8 shows a block diagram 800 of a UE communications manager 815 that supports determination of reference signal patterns in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include resource grant manager 820, indication manager 825, symbol position manager 830, end symbol manager 835, RE FDM manager 840, and RS count indication manager 845. Each of these modules may communicate, directly or indirectly, with one another (e.g., via one or more buses).

Resource grant manager 820 may receive, from a base station, a resource grant for a data communication within a TTI.

Indication manager 825 may receive, from the base station, an indication of a control signal configuration and an end symbol index associated with the resource grant.

Symbol position manager 830 may identify, based on the received indication, a set of symbol positions in the TTI in which reference signals are to be communicated in conjunction with the data communication and identify the set of symbol positions based on the selected reference signal configuration. In some cases, identifying the set of symbol positions in the TTI in which reference signals are to be communicated includes: selecting a reference signal configuration for the TTI from a set of reference signal configurations based on the received indication.

End symbol manager 835 may identify the end symbol index as associated with a last data symbol in the TTI used for the data communication and identify the last symbol position based on the additional indication. In some cases, identifying the set of symbol positions in the TTI in which reference signals are to be communicated further includes: receiving, from the base station, an additional indication of a last symbol position of the set of positions in the TTI in which reference signals are to be communicated, the additional indication being relative to the end symbol index. In some cases, the additional indication indicates whether the last symbol position is before or after the end symbol index. In some cases, the additional indication includes at least one bit in a downlink control indicator (DCI). In some cases, the additional indication includes a field in a radio resource control (RRC) signal.

FDM manager 840 may determine that one or more resource elements of one or more of the set of symbol positions are available for data communications, multiplex, in the frequency domain, the data communication and a reference signal communicated in the one or more of the set of symbol positions, determine that no resource elements of a symbol position of the set of symbol positions are available for the data communication, and communicate, based on the determining, a reference signal in the symbol position of the set of symbol positions.

RS count indication manager 845 may receive, from the base station, a reference signal count indication, indicating a number of reference signals to be communicated in the TTI and receive, from the base station, an additional indication of a last symbol position of the set of positions in the TTI in which reference signals are to be communicated, the additional indication being relative to the end symbol index, where the additional indication has priority over the reference signal count indication if a conflict exists between the number of reference signals to be communicated in the TTI and the set of symbol positions. In some cases, the reference signal count indication is received in a RRC signal and the additional indication is received in a DCI signaling.

Figure 9:
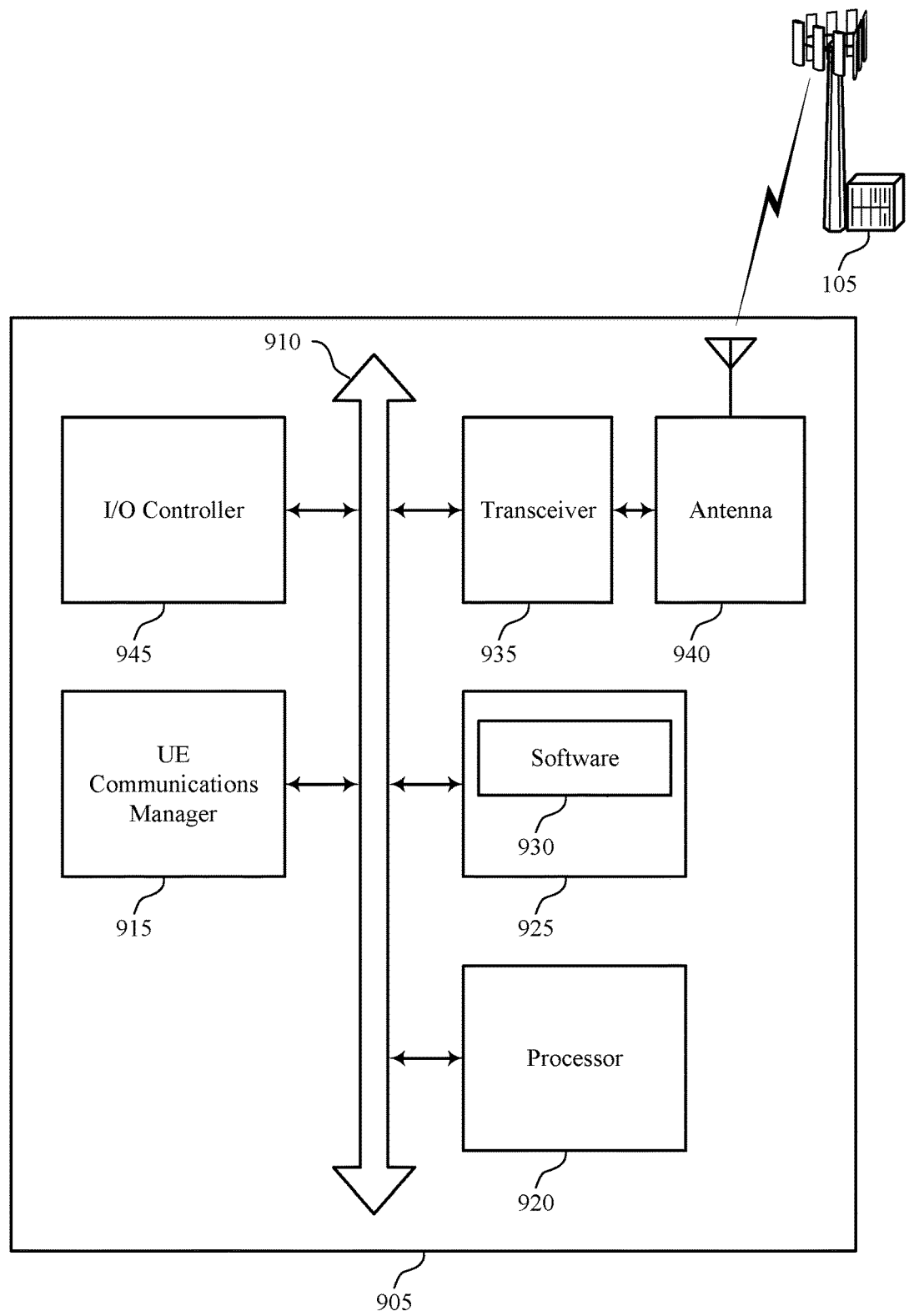
FIG. 9 illustrates a block diagram of a system including a user equipment (UE) that supports determination of reference signal patterns in accordance with aspects of the present disclosure.

FIG. 9 shows a diagram of a system 900 including a device 905 that supports determination of reference signal patterns in accordance with aspects of the present disclosure. Device 905 may be an example of or include the components of wireless device 605, wireless device 705, or a UE 115 as described herein. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting determination of reference signal patterns).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support determination of reference signal patterns. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
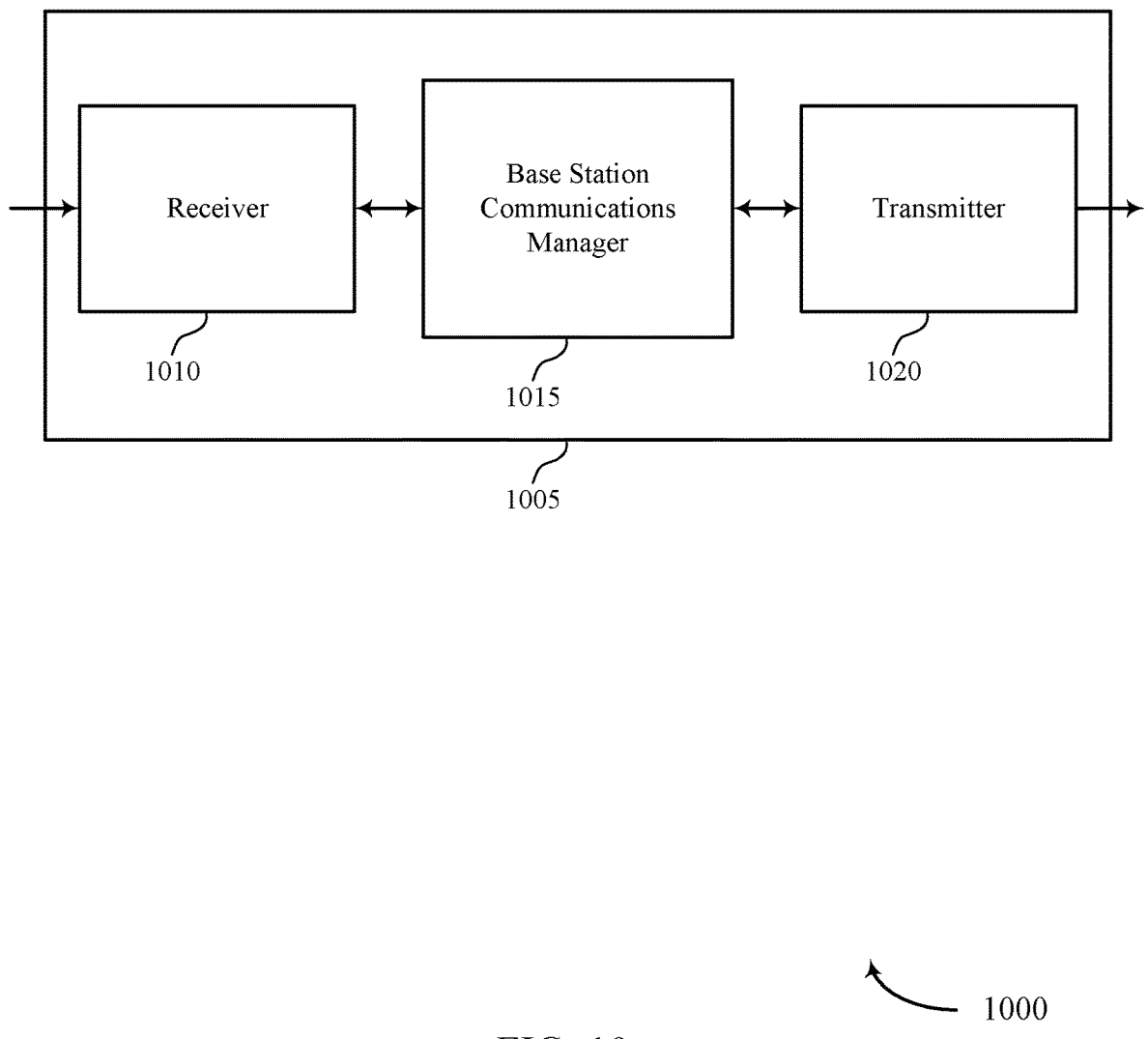
FIGS. 10 through 12 show block diagrams of a device that supports determination of reference signal patterns in accordance with aspects of the present disclosure.

FIG. 10 shows a block diagram 1000 of a wireless device 1005 that supports determination of reference signal patterns in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to determination of reference signal patterns, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit, to a UE, a resource grant for a data communication within a TTI, select a set of symbol positions in the TTI in which reference signals are to be communicated in conjunction with a data communication, and transmit an indication of a control signal configuration and an end symbol index associated with the resource grant so as to allow the UE to identify the set of symbol positions in the TTI in which reference signals are to be communicated.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
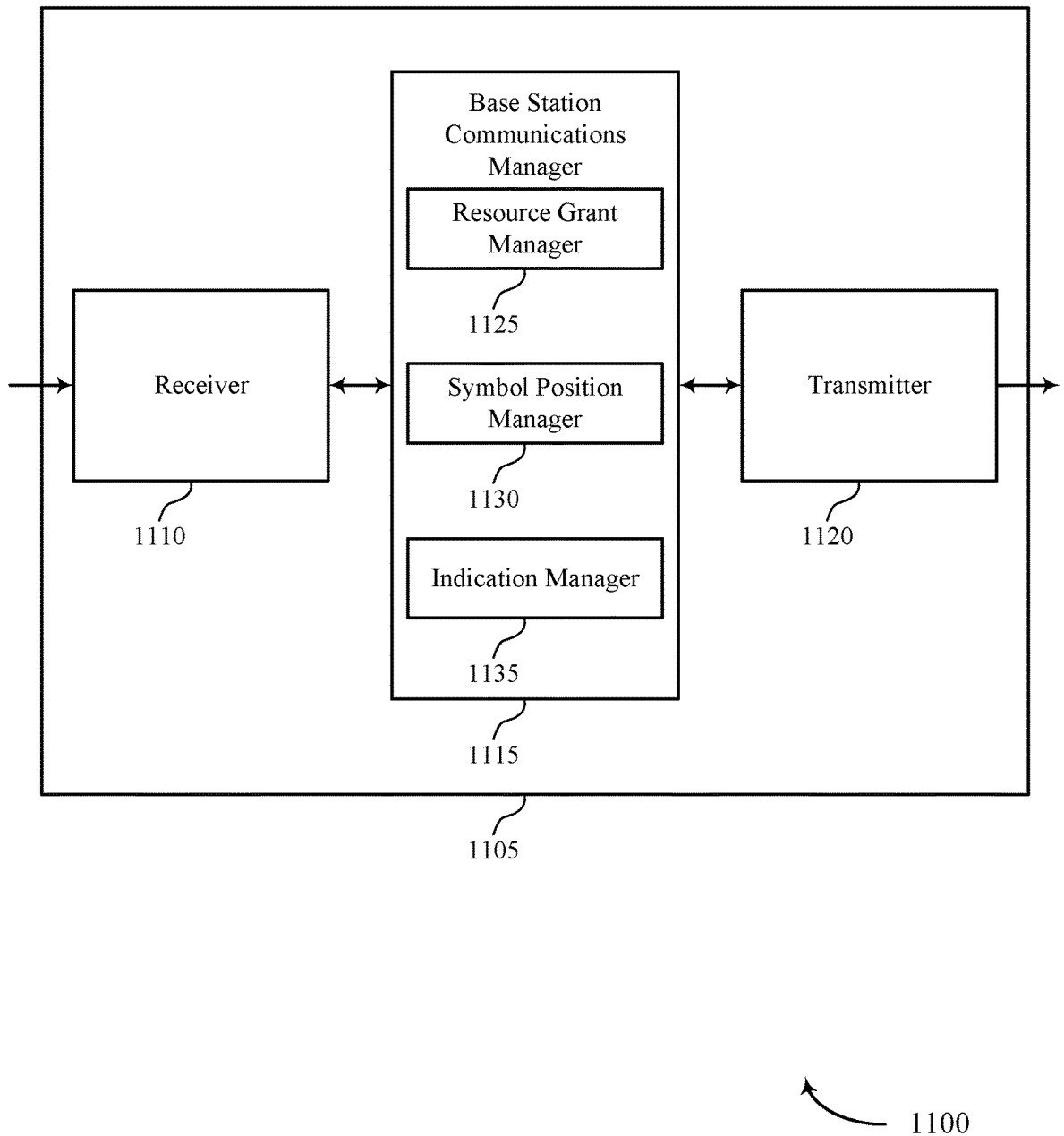

FIG. 11 shows a block diagram 1100 of a wireless device 1105 that supports determination of reference signal patterns in accordance with aspects of the present disclosure. Wireless device 1105 may be an example of aspects of a wireless device 1005 or a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to determination of reference signal patterns, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include resource grant manager 1125, symbol position manager 1130, and indication manager 1135.

Resource grant manager 1125 may transmit, to a UE, a resource grant for a data communication within a TTI.

Symbol position manager 1130 may select a set of symbol positions in the TTI in which reference signals are to be communicated in conjunction with a data communication.

Indication manager 1135 may transmit an indication of a control signal configuration and an end symbol index associated with the resource grant so as to allow the UE to identify the set of symbol positions in the TTI in which reference signals are to be communicated.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
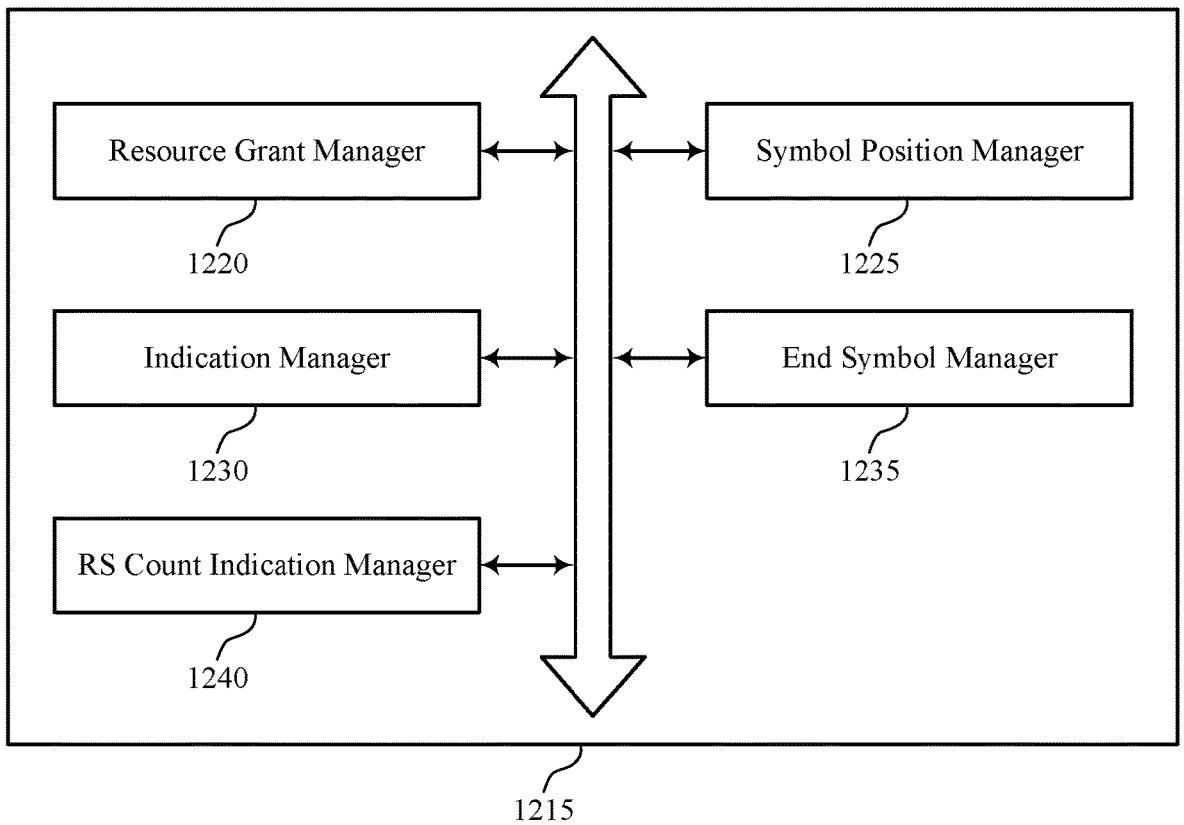

FIG. 12 shows a block diagram 1200 of a base station communications manager 1215 that supports determination of reference signal patterns in accordance with aspects of the present disclosure. The base station communications manager 1215 may be an example of aspects of a base station communications manager 1315 described with reference to FIGS. 10, 11, and 13. The base station communications manager 1215 may include resource grant manager 1220, symbol position manager 1225, indication manager 1230, end symbol manager 1235, and RS count indication manager 1240. Each of these modules may communicate, directly or indirectly, with one another (e.g., via one or more buses).

Resource grant manager 1220 may transmit, to a UE, a resource grant for a data communication within a TTI.

Symbol position manager 1225 may select a set of symbol positions in the TTI in which reference signals are to be communicated in conjunction with a data communication.

Indication manager 1230 may transmit an indication of a control signal configuration and an end symbol index associated with the resource grant so as to allow the UE to identify the set of symbol positions in the TTI in which reference signals are to be communicated.

End symbol manager 1235 may select a last symbol position of the set of positions in the TTI in which reference signals are to be communicated, relative to the end symbol index, transmit an additional indication of the last symbol position to the UE, transmit the additional indication in at least one bit of a downlink control indicator (DCI), and transmit the additional indication in a field of a RRC signal.

RS count indication manager 1240 may transmit, to the UE, a reference signal count indication, indicating a number of reference signals to be communicated in the TTI and transmit, to the UE, an additional indication of a last symbol position of the set of positions in the TTI in which reference signals are to be communicated, the additional indication being relative to the end symbol index, where the additional indication has priority over the reference signal count indication if a conflict exists between the number of reference signals to be communicated in the TTI and the one or more symbol positions.

Figure 13:
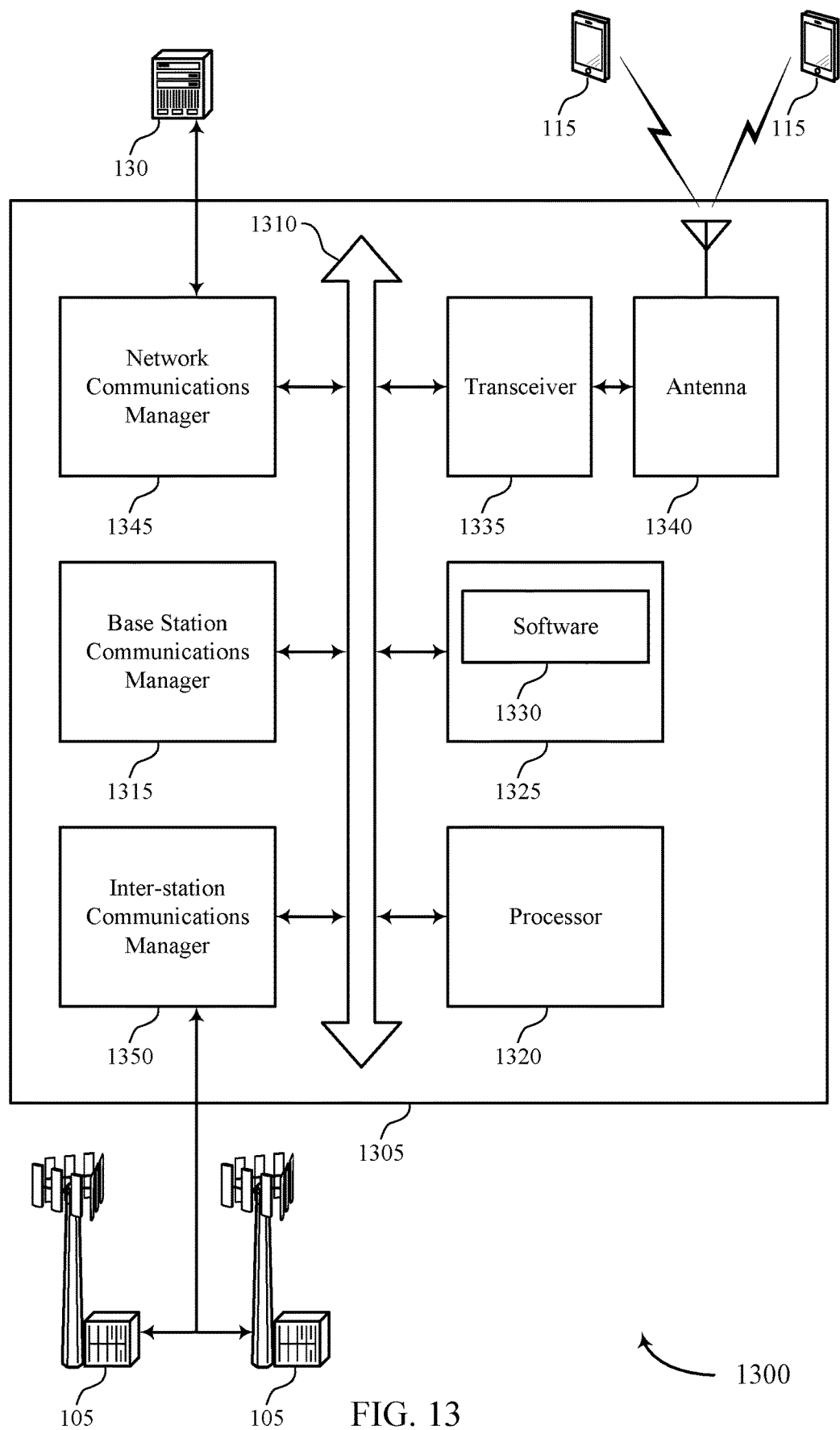
FIG. 13 illustrates a block diagram of a system including a base station that supports determination of reference signal patterns in accordance with aspects of the present disclosure.

FIG. 13 shows a diagram of a system 1300 including a device 1305 that supports determination of reference signal patterns in accordance with aspects of the present disclosure. Device 1305 may be an example of or include the components of base station 105 as described herein. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting determination of reference signal patterns).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support determination of reference signal patterns. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
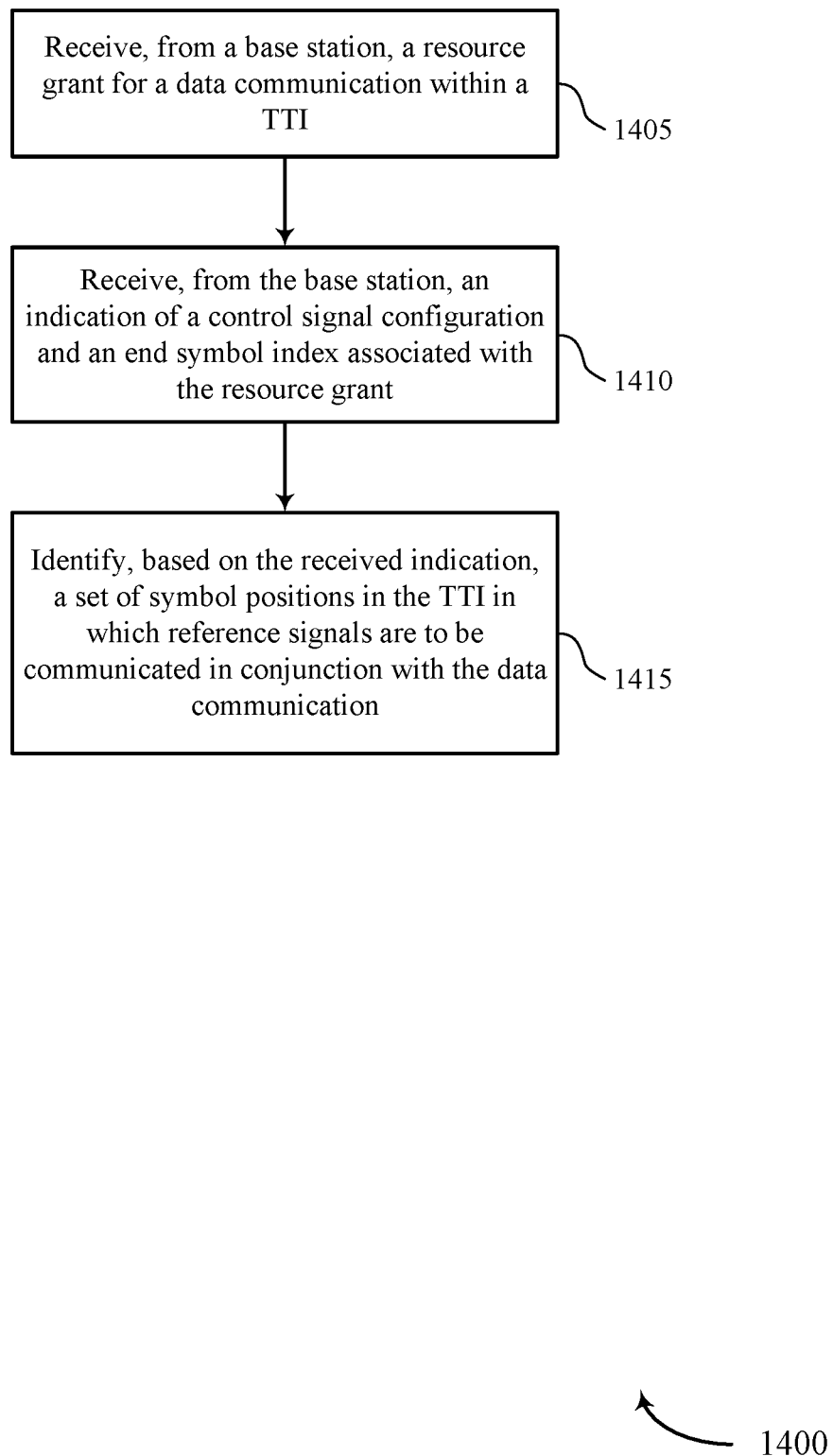
FIGS. 14 through 18 illustrate methods for determination of reference signal patterns in accordance with aspects of the present disclosure.

FIG. 14 shows a flowchart illustrating a method 1400 for determination of reference signal patterns in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, from a base station, a resource grant for a data communication within a TTI. The operations of block 1405 may be performed according to the methods described herein. In certain examples, aspects of the operations of block 1405 may be performed by a resource grant manager as described with reference to FIGS. 6 through 9.

At block 1410 the UE 115 may receive, from the base station, an indication of a control signal configuration and an end symbol index associated with the resource grant. The operations of block 1410 may be performed according to the methods described herein. In certain examples, aspects of the operations of block 1410 may be performed by an indication manager as described with reference to FIGS. 6 through 9.

At block 1415 the UE 115 may identify, based at least in part on the received indication, a plurality of symbol positions in the TTI in which reference signals are to be communicated in conjunction with the data communication. The operations of block 1415 may be performed according to the methods described herein. In certain examples, aspects of the operations of block 1415 may be performed by a symbol position manager as described with reference to FIGS. 6 through 9.

Figure 15:
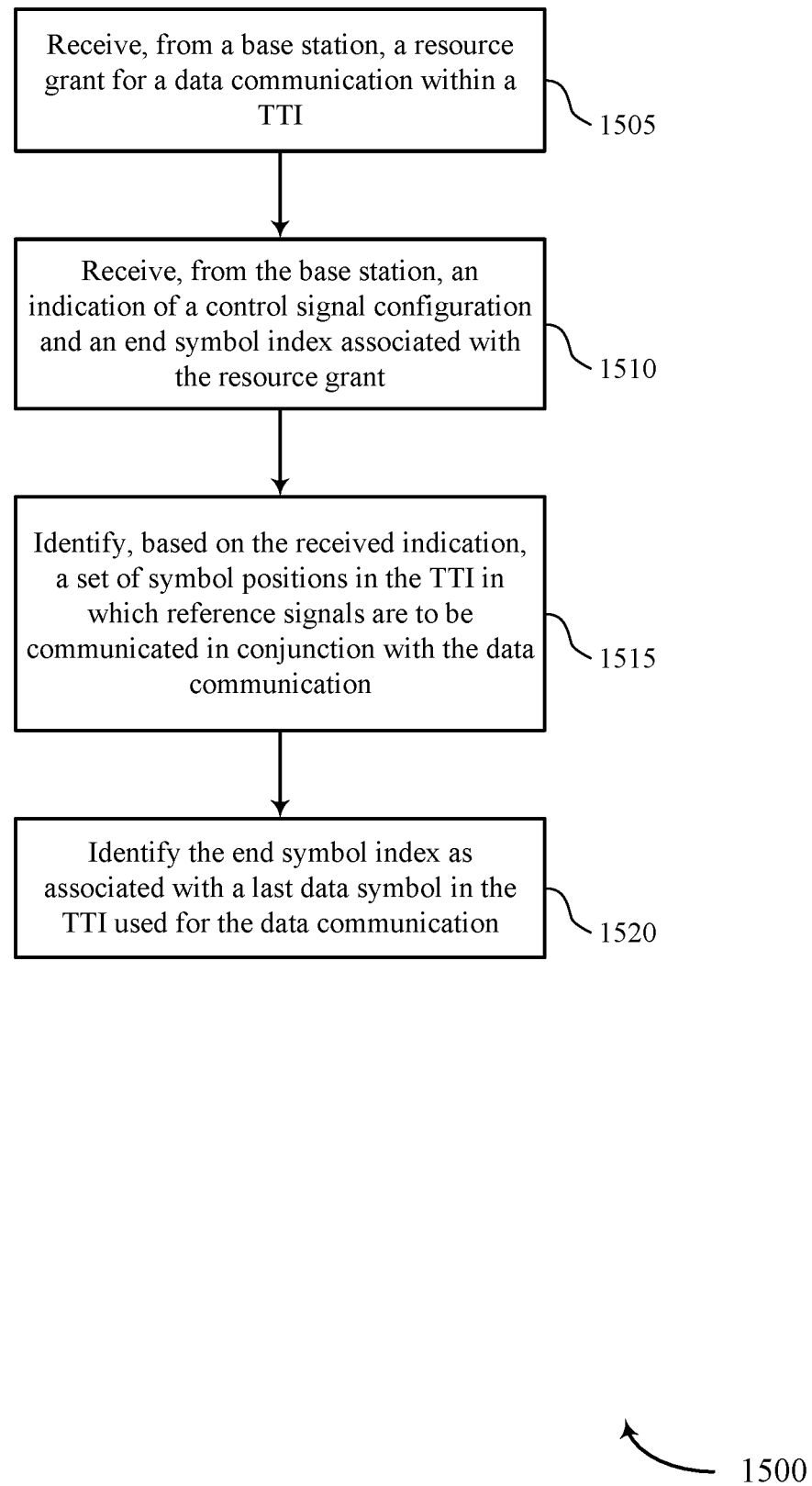

FIG. 15 shows a flowchart illustrating a method 1500 for determination of reference signal patterns in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, from a base station, a resource grant for a data communication within a TTI. The operations of block 1505 may be performed according to the methods described herein. In certain examples, aspects of the operations of block 1505 may be performed by a resource grant manager as described with reference to FIGS. 6 through 9.

At block 1510 the UE 115 may receive, from the base station, an indication of a control signal configuration and an end symbol index associated with the resource grant. The operations of block 1510 may be performed according to the methods described herein. In certain examples, aspects of the operations of block 1510 may be performed by an indication manager as described with reference to FIGS. 6 through 9.

At block 1515 the UE 115 may identify, based at least in part on the received indication, a plurality of symbol positions in the TTI in which reference signals are to be communicated in conjunction with the data communication. The operations of block 1515 may be performed according to the methods described herein. In certain examples, aspects of the operations of block 1515 may be performed by a symbol position manager as described with reference to FIGS. 6 through 9.

At block 1520 the UE 115 may identify the end symbol index as associated with a last data symbol in the TTI used for the data communication. The operations of block 1520 may be performed according to the methods described herein. In certain examples, aspects of the operations of block 1520 may be performed by an end symbol manager as described with reference to FIGS. 6 through 9.

Figure 16:
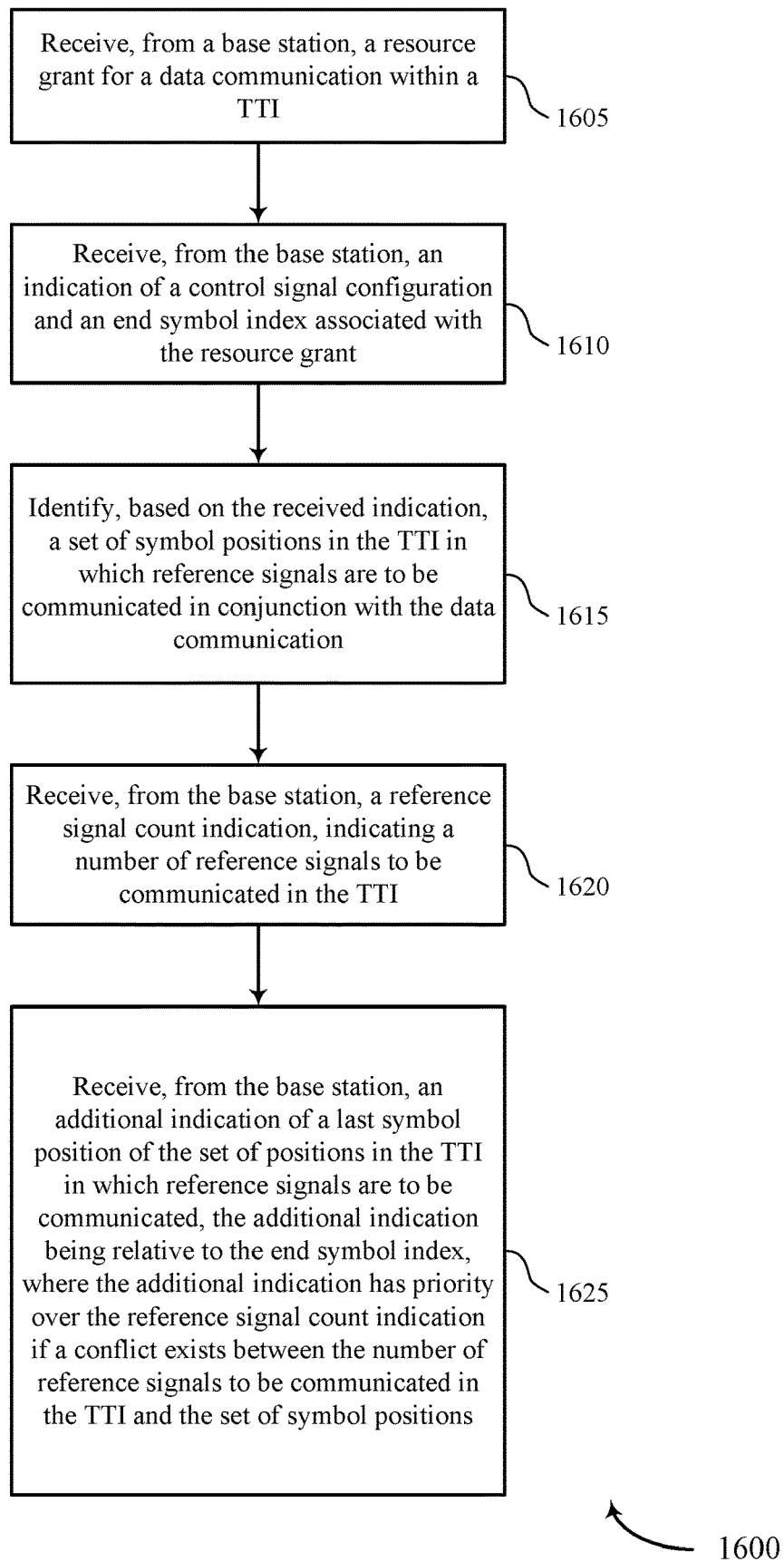

FIG. 16 shows a flowchart illustrating a method 1600 for determination of reference signal patterns in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station, a resource grant for a data communication within a TTI. The operations of block 1605 may be performed according to the methods described herein. In certain examples, aspects of the operations of block 1605 may be performed by a resource grant manager as described with reference to FIGS. 6 through 9.

At block 1610 the UE 115 may receive, from the base station, an indication of a control signal configuration and an end symbol index associated with the resource grant. The operations of block 1610 may be performed according to the methods described herein. In certain examples, aspects of the operations of block 1610 may be performed by an indication manager as described with reference to FIGS. 6 through 9.

At block 1615 the UE 115 may identify, based at least in part on the received indication, a plurality of symbol positions in the TTI in which reference signals are to be communicated in conjunction with the data communication. The operations of block 1615 may be performed according to the methods described herein. In certain examples, aspects of the operations of block 1615 may be performed by a symbol position manager as described with reference to FIGS. 6 through 9.

At block 1620 the UE 115 may receive, from the base station, a reference signal count indication, indicating a number of reference signals to be communicated in the TTI. The operations of block 1620 may be performed according to the methods described herein. In certain examples, aspects of the operations of block 1620 may be performed by a RS count indication manager as described with reference to FIGS. 6 through 9.

At block 1625 the UE 115 may receive, from the base station, an additional indication of a last symbol position of the plurality of positions in the TTI in which reference signals are to be communicated, the additional indication being relative to the end symbol index, wherein the additional indication has priority over the reference signal count indication if a conflict exists between the number of reference signals to be communicated in the TTI and the plurality of symbol positions. The operations of block 1625 may be performed according to the methods described herein. In certain examples, aspects of the operations of block 1625 may be performed by a RS count indication manager as described with reference to FIGS. 6 through 9.

Figure 17:
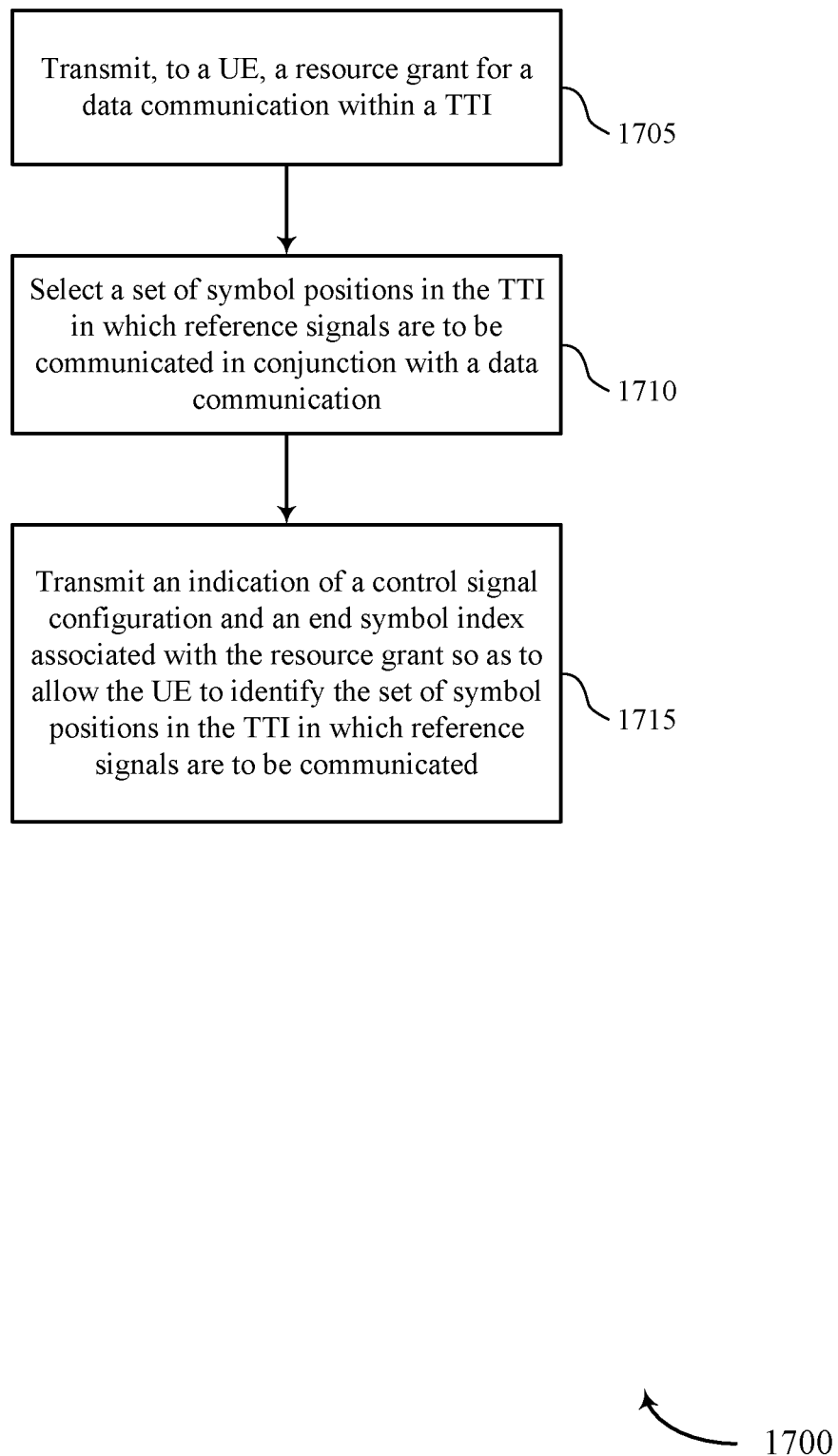

FIG. 17 shows a flowchart illustrating a method 1700 for determination of reference signal patterns in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit, to a UE, a resource grant for a data communication within a TTI. The operations of block 1705 may be performed according to the methods described herein. In certain examples, aspects of the operations of block 1705 may be performed by a resource grant manager as described with reference to FIGS. 10 through 13.

At block 1710 the base station 105 may select a plurality of symbol positions in the TTI in which reference signals are to be communicated in conjunction with a data communication. The operations of block 1710 may be performed according to the methods described herein. In certain examples, aspects of the operations of block 1710 may be performed by a symbol position manager as described with reference to FIGS. 10 through 13.

At block 1715 the base station 105 may transmit an indication of a control signal configuration and an end symbol index associated with the resource grant so as to allow the UE to identify the plurality of symbol positions in the TTI in which reference signals are to be communicated. The operations of block 1715 may be performed according to the methods described herein. In certain examples, aspects of the operations of block 1715 may be performed by an indication manager as described with reference to FIGS. 10 through 13.

Figure 18:
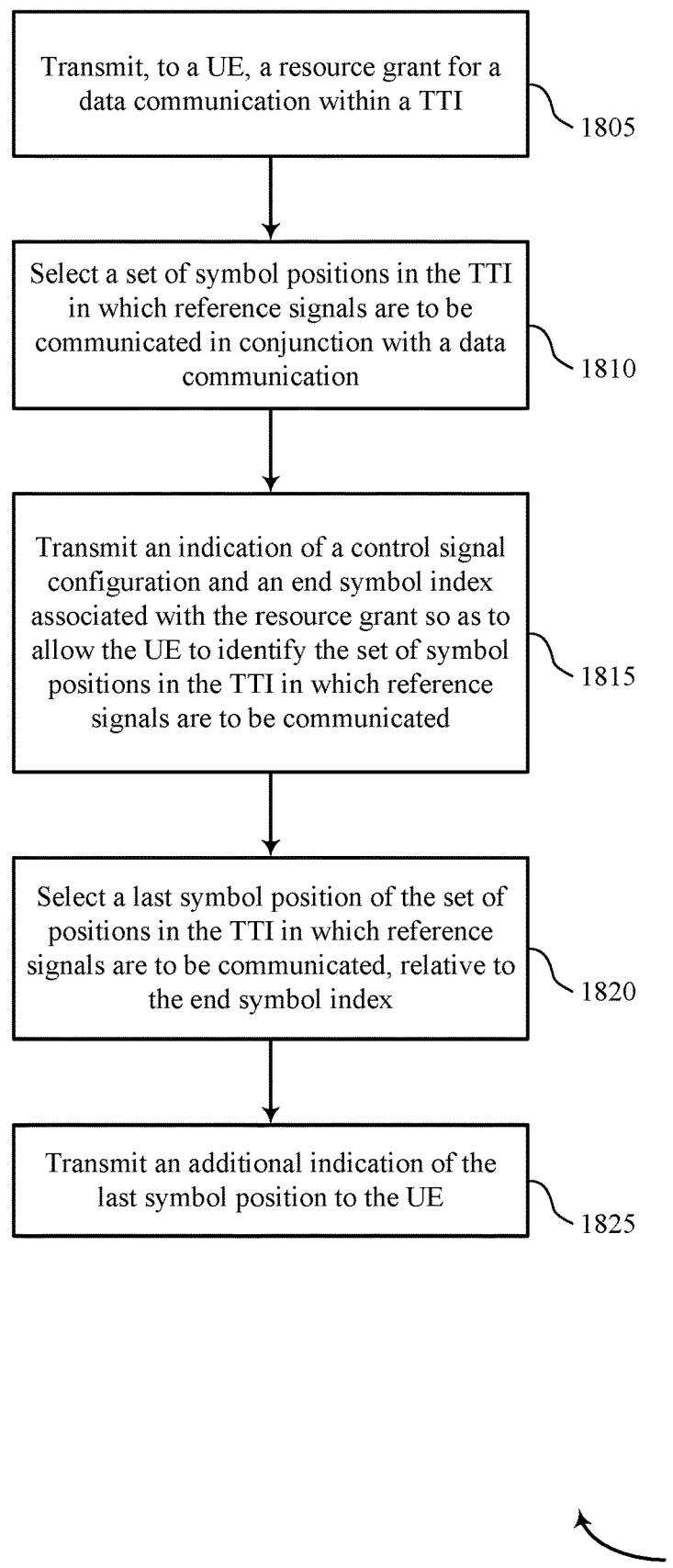

FIG. 18 shows a flowchart illustrating a method 1800 for determination of reference signal patterns in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit, to a UE, a resource grant for a data communication within a TTI. The operations of block 1805 may be performed according to the methods described herein. In certain examples, aspects of the operations of block 1805 may be performed by a resource grant manager as described with reference to FIGS. 10 through 13.

At block 1810 the base station 105 may select a plurality of symbol positions in the TTI in which reference signals are to be communicated in conjunction with a data communication. The operations of block 1810 may be performed according to the methods described herein. In certain examples, aspects of the operations of block 1810 may be performed by a symbol position manager as described with reference to FIGS. 10 through 13.

At block 1815 the base station 105 may transmit an indication of a control signal configuration and an end symbol index associated with the resource grant so as to allow the UE to identify the plurality of symbol positions in the TTI in which reference signals are to be communicated. The operations of block 1815 may be performed according to the methods described herein. In certain examples, aspects of the operations of block 1815 may be performed by an indication manager as described with reference to FIGS. 10 through 13.

At block 1820 the base station 105 may select a last symbol position of the plurality of positions in the TTI in which reference signals are to be communicated, relative to the end symbol index. The operations of block 1820 may be performed according to the methods described herein. In certain examples, aspects of the operations of block 1820 may be performed by an end symbol manager as described with reference to FIGS. 10 through 13.

At block 1825 the base station 105 may transmit an additional indication of the last symbol position to the UE. The operations of block 1825 may be performed according to the methods described herein. In certain examples, aspects of the operations of block 1825 may be performed by an end symbol manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a base station, a resource grant for a data communication within a transmission time interval (TTI);
   receiving, from the base station, an indication comprising both a control signal configuration and an end symbol index associated with the resource grant;
   receiving, from the base station, a reference signal count indication, indicating a number of reference signals to be communicated in the TTI, wherein the reference signal count indication is based at least in part on a duration of the data communication;
   selecting a reference signal configuration for the TTI from a set of reference signal configurations based at least in part on the received indication comprising the end symbol index and the reference signal count indication; and
   identifying a plurality of symbol positions in the TTI in which reference signals are to be communicated in conjunction with the data communication based at least in part on the selected reference signal configuration.

2. The method of claim 1, further comprising:
   identifying the end symbol index as associated with a last data symbol for transmission on a data channel in the TTI.

3. The method of claim 2, wherein identifying the plurality of symbol positions in the TTI in which reference signals are to be communicated further comprises:
   receiving, from the base station, an additional indication of a last symbol position of the plurality of symbol positions in the TTI in which reference signals are to be communicated, the additional indication being relative to the end symbol index; and
   identifying the last symbol position based at least in part on the additional indication.

4. The method of claim 3, wherein the additional indication indicates whether the last symbol position is before or after the end symbol index.

5. The method of claim 3, wherein the additional indication comprises at least one bit in a downlink control indicator (DCI).

6. The method of claim 3, wherein the additional indication comprises a field in a radio resource control (RRC) signal.

7. The method of claim 1, further comprising:
   determining that one or more resource elements of one or more of the plurality of symbol positions are available for data communications; and
   multiplexing, in a frequency domain, the data communication and a reference signal communicated in the one or more of the plurality of symbol positions.

8. The method of claim 1, further comprising:
   determining that no resource elements of a symbol position of the plurality of symbol positions are available for the data communication; and
   communicating, based at least in part on the determining, a reference signal in the symbol position of the plurality of symbol positions.

9. The method of claim 1, further comprising:
   receiving, from the base station, an additional indication of a last symbol position of the plurality of symbol positions in the TTI in which reference signals are to be communicated, the additional indication being relative to the end symbol index, wherein the additional indication has priority over the reference signal count indication if a conflict exists between the number of reference signals to be communicated in the TTI and the plurality of symbol positions.

10. The method of claim 9, wherein the reference signal count indication is received in a radio resource control (RRC) signal and the additional indication is received in a downlink control indicator (DCI) signaling.

11. A method for wireless communication, comprising:
    transmitting, to a user equipment (UE), a resource grant for a data communication within a transmission time interval (TTI);
    selecting a plurality of symbol positions in the TTI in which reference signals are to be communicated in conjunction with a data communication;
    transmitting, to the UE, a reference signal count indication, indicating a number of reference signals to be communicated in the TTI, wherein the reference signal count indication is based at least in part on a duration of the data communication; and
    transmitting an indication comprising both a control signal configuration and an end symbol index associated with the resource grant so as to allow the UE to identify the plurality of symbol positions in the TTI in which reference signals are to be communicated, wherein the reference signals are communicated in accordance with a selected reference signal configuration that corresponds to the transmitted indication comprising the end symbol index and the reference signal count indication.

12. The method of claim 11, further comprising:
selecting a last symbol position of the plurality of symbol positions in the TTI in which reference signals are to be communicated, relative to the end symbol index; and
transmitting an additional indication of the last symbol position to the UE.

13. The method of claim 12, further comprising:
transmitting the additional indication in at least one bit of a downlink control indicator (DCI).

14. The method of claim 12, further comprising:
transmitting the additional indication in a field of a radio resource control (RRC) signal.

15. The method of claim 11, further comprising:
transmitting, to the UE, an additional indication of a last symbol position of the plurality of symbol positions in the TTI in which reference signals are to be communicated, the additional indication being relative to the end symbol index, wherein the additional indication has priority over the reference signal count indication if a conflict exists between the number of reference signals to be communicated in the TTI and the plurality of symbol positions.

16. An apparatus for wireless communication, comprising:
a processor;
memory in electronic communication with the processor; and
instructions stored in the memory and operable, when executed by the processor, to cause the apparatus to:
receive, from a base station, a resource grant for a data communication within a transmission time interval (TTI);
receive, from the base station, an indication comprising both a control signal configuration and an end symbol index associated with the resource grant;
receive, from the base station, a reference signal count indication, indicating a number of reference signals to be communicated in the TTI, wherein the reference signal count indication is based at least in part on a duration of the data communication;
selecting a reference signal configuration for the TTI from a set of reference signal configurations based at least in part on the received indication comprising the end symbol index and the reference signal count indication; and
identify a plurality of symbol positions in the TTI in which reference signals are to be communicated in conjunction with the data communication based at least in part on the selected reference signal configuration.

17. The apparatus of claim 16, wherein the instructions are further executable by the processor to:
identify the end symbol index as associated with a last data symbol for transmission on a data channel in the TTI.

18. The apparatus of claim 17, wherein the instructions for identifying the plurality of symbol positions in the TTI in which reference signals are to be communicated are further executable by the processor to:
receive, from the base station, an additional indication of a last symbol position of the plurality of symbol positions in the TTI in which reference signals are to be communicated, the additional indication being relative to the end symbol index; and
identify the last symbol position based at least in part on the additional indication.

19. The apparatus of claim 18, wherein the additional indication indicates whether the last symbol position is before or after the end symbol index.

20. The apparatus of claim 18, wherein the additional indication comprises at least one bit in a downlink control indicator (DCI).

21. The apparatus of claim 18, wherein the additional indication comprises a field in a radio resource control (RRC) signal.

22. The apparatus of claim 16, wherein the instructions are further executable by the processor to:
determine that one or more resource elements of one or more of the plurality of symbol positions are available for data communications; and
multiplex, in a frequency domain, the data communication and a reference signal communicated in the one or more of the plurality of symbol positions.

23. The apparatus of claim 16, wherein the instructions are further executable by the processor to:
determine that no resource elements of a symbol position of the plurality of symbol positions are available for the data communication; and
communicate, based at least in part on the determining, a reference signal in the symbol position of the plurality of symbol positions.

24. The apparatus of claim 16, wherein the instructions are further executable by the processor to:
receive, from the base station, an additional indication of a last symbol position of the plurality of symbol positions in the TTI in which reference signals are to be communicated, the additional indication being relative to the end symbol index, wherein the additional indication has priority over the reference signal count indication if a conflict exists between the number of reference signals to be communicated in the TTI and the plurality of symbol positions.

25. The apparatus of claim 24, wherein the reference signal count indication is received in a radio resource control (RRC) signal and the additional indication is received in a downlink control indicator (DCI) signaling.

26. An apparatus for wireless communication, comprising:
a processor;
memory in electronic communication with the processor; and
instructions stored in the memory and operable, when executed by the processor, to cause the apparatus to:
transmit, to a user equipment (UE), a resource grant for a data communication within a transmission time interval (TTI);
select a plurality of symbol positions in the TTI in which reference signals are to be communicated in conjunction with a data communication;
transmitting, to the UE, a reference signal count indication, indicating a number of reference signals to be communicated in the TTI, wherein the reference signal count indication is based at least in part on a duration of the data communication; and
transmit an indication comprising both a control signal configuration and an end symbol index associated with the resource grant so as to allow the UE to identify the plurality of symbol positions in the TTI in which reference signals are to be communicated, wherein the reference signals are communicated in accordance with a selected reference signal configuration that corresponds to the transmitted indication comprising the end symbol index and the reference signal count indication.

27. The apparatus of claim 26, wherein the instructions are further executable by the processor to:
   select a last symbol position of the plurality of symbol positions in the TTI in which reference signals are to be communicated, relative to the end symbol index; and
   transmit an additional indication of the last symbol position to the UE.

28. The apparatus of claim 27, wherein the instructions are further executable by the processor to:
   transmit the additional indication in at least one bit of a downlink control indicator (DCI).

29. The apparatus of claim 27, wherein the instructions are further executable by the processor to:
   transmit the additional indication in a field of a radio resource control (RRC) signal.

30. The apparatus of claim 26, wherein the instructions are further executable by the processor to:
   transmit, to the UE, an additional indication of a last symbol position of the plurality of symbol positions in the TTI in which reference signals are to be communicated, the additional indication being relative to the end symbol index, wherein the additional indication has priority over the reference signal count indication if a conflict exists between the number of reference signals to be communicated in the TTI and the plurality of symbol positions.

* * * * *